(12) United States Patent
Nasiri et al.

(10) Patent No.: US 9,174,123 B2
(45) Date of Patent: Nov. 3, 2015

(54) HANDHELD COMPUTER SYSTEMS AND TECHNIQUES FOR CHARACTER AND COMMAND RECOGNITION RELATED TO HUMAN MOVEMENTS

(75) Inventors: Steve Nasiri, Saratoga, CA (US); David Sachs, Sunnyvale, CA (US); Alex Castro, Concord, CA (US); Richard Li, Mountain View, CA (US); Anjia Gu, Stanford, CA (US); Shang-Hung Lin, San Jose, CA (US); Takashi Nakayama, Tokyo (JP)

(73) Assignee: INVENSENSE, INC., San Jose, CA (US)

( * ) Notice: Subject to any disclaimer, the term of this patent is extended or adjusted under 35 U.S.C. 154(b) by 404 days.

(21) Appl. No.: 12/832,707

(22) Filed: Jul. 8, 2010

(65) Prior Publication Data
US 2012/0007713 A1    Jan. 12, 2012

Related U.S. Application Data

(60) Provisional application No. 61/259,288, filed on Nov. 9, 2009.

(51) Int. Cl.
*G05B 23/00* (2006.01)
*A63F 13/20* (2014.01)
(Continued)

(52) U.S. Cl.
CPC .............. *A63F 13/06* (2013.01); *G06F 1/1626* (2013.01); *G06F 1/1694* (2013.01); *G06F 3/017* (2013.01);
(Continued)

(58) Field of Classification Search
CPC ...................................................... G06F 21/36

USPC .............. 340/5.81, 12.22, 5.61; 341/20, 176; 382/185; 702/150
See application file for complete search history.

(56) References Cited

U.S. PATENT DOCUMENTS 5,252,951 A * 10/1993 Tannenbaum et al. ........ 345/156
6,249,792 B1 *  6/2001 Zwilling et al. ...................... 1/1
(Continued)

FOREIGN PATENT DOCUMENTS

CN       101365193 A    2/2009
EP         0429391 B1    8/1995
(Continued)

OTHER PUBLICATIONS

International Search Report and Written Opinion for International Application No. PCT/US2010/56065, mailing date Jan. 27, 2011, 16 pages.

(Continued)

*Primary Examiner* — Vernal Brown
(74) *Attorney, Agent, or Firm* — Sawyer Law Group, P.C.

(57) ABSTRACT

Systems and methods for human hand gesture recognition through a training mode and a recognition mode are disclosed. In the training mode, a user can move a handheld device with a hand gesture intended to represent a command. Sensors within the handheld device can record raw data, which can be processed to obtain a set of values corresponding to a set of discrete features, which is stored in a database and associated with the intended command. The process is repeated for various hand gestures representing different commands. In the recognition mode, the user can move the handheld device with a hand gesture. A computer system can compare a set of values corresponding to a set of discrete features derived from the hand gesture with the sets of values stored in the database, select a command with the closest match and displays and/or executes the command.

46 Claims, 19 Drawing Sheets

EXEMPLARY FLOW CHART

(51) Int. Cl.
*G06F 1/16* (2006.01)
*G06F 3/01* (2006.01)
*G06F 3/0346* (2013.01)
*G06F 3/038* (2013.01)
*G06F 21/32* (2013.01)
*H04M 1/725* (2006.01)

(52) U.S. Cl.
CPC .............. *G06F 3/038* (2013.01); *G06F 3/0346* (2013.01); *G06F 21/32* (2013.01); *A63F 2300/105* (2013.01); *A63F 2300/204* (2013.01); *A63F 2300/6045* (2013.01); *H04M 1/72519* (2013.01); *H04M 2250/12* (2013.01)

(56) References Cited

U.S. PATENT DOCUMENTS

| | | | |
|---|---|---|---|
| 6,842,991 B2 * | 1/2005 | Levi et al. | 33/356 |
| 7,180,500 B2 | 2/2007 | Marvit et al. | |
| 7,333,087 B2 | 2/2008 | Soh et al. | |
| 7,358,008 B2 * | 4/2008 | Nanno et al. | 429/209 |
| 7,496,286 B2 * | 2/2009 | Zhao | 396/53 |
| 7,508,384 B2 | 3/2009 | Zhang et al. | |
| 7,548,203 B2 * | 6/2009 | Kalliola et al. | 342/418 |
| 7,739,061 B2 * | 6/2010 | Bonnat | 702/48 |
| 7,777,649 B2 * | 8/2010 | De Ruyter et al. | 341/20 |
| 7,940,986 B2 * | 5/2011 | Mekenkamp et al. | 382/181 |
| 7,961,173 B2 * | 6/2011 | Boillot | 345/158 |
| 8,115,731 B2 * | 2/2012 | Varanda | 345/156 |
| 8,250,921 B2 * | 8/2012 | Nasiri et al. | 73/511 |
| 8,289,162 B2 * | 10/2012 | Mooring et al. | 340/546 |
| 2005/0110778 A1 | 5/2005 | Ben Ayed | |
| 2005/0212911 A1 | 9/2005 | Marvit et al. | |
| 2006/0033702 A1 | 2/2006 | Beardsley et al. | |
| 2006/0052109 A1 * | 3/2006 | Ashman et al. | 455/440 |
| 2006/0061545 A1 | 3/2006 | Hughes et al. | |
| 2006/0139327 A1 | 6/2006 | Dawson et al. | |
| 2006/0164382 A1 | 7/2006 | Kulas et al. | |
| 2007/0027367 A1 * | 2/2007 | Oliver et al. | 600/300 |
| 2007/0032748 A1 | 2/2007 | McNeil et al. | |
| 2007/0176898 A1 | 8/2007 | Suh | |
| 2008/0134784 A1 | 6/2008 | Jeng et al. | |
| 2008/0170776 A1 | 7/2008 | Albertson et al. | |
| 2009/0088204 A1 | 4/2009 | Culbert et al. | |
| 2009/0182955 A1 * | 7/2009 | Cherukuri | 711/141 |
| 2009/0195497 A1 | 8/2009 | Fitzgerald et al. | |
| 2009/0262074 A1 | 10/2009 | Nasiri et al. | |
| 2009/0265671 A1 * | 10/2009 | Sachs et al. | 715/863 |

FOREIGN PATENT DOCUMENTS

| | | |
|---|---|---|
| JP | 2001236174 | 8/2001 |
| JP | 2008299866 | 12/2008 |
| JP | 2009054129 | 3/2009 |
| JP | 2009165826 | 7/2009 |
| WO | WO 2009/026337 | 2/2009 |

OTHER PUBLICATIONS

Cho, et al. Dynamics of Tilt-based Browsing on Mobile Devices. CHI 2007, Apr. 28-May 3, 2007, San Jose, California, USA. pp. 1947-1952.

"Introduction and improvement of computer DIY and maintenance," Dung Fang Ren Hwa, Tsinghua University Press, 2005.

* cited by examiner

EXEMPLARY FLOW CHART FIG. 1

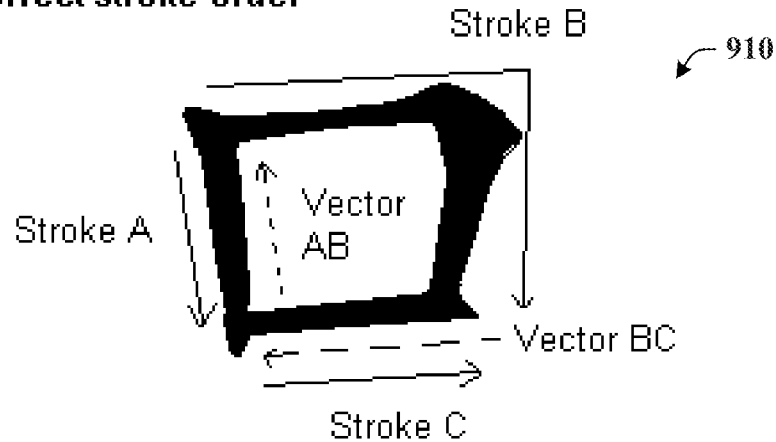
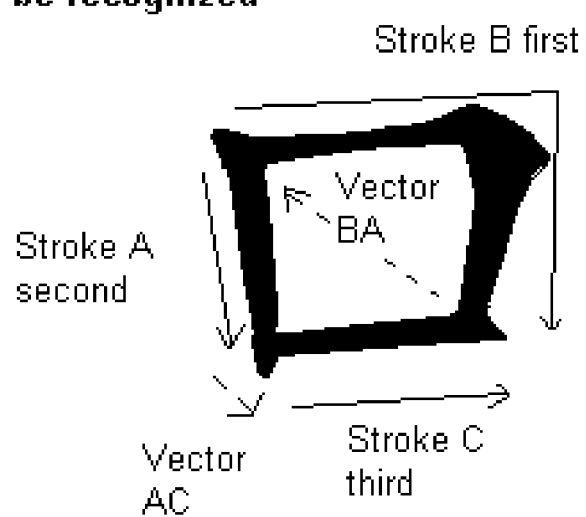
FIG. 9

EXEMPLARY FLOW CHART

HANDHELD COMPUTER SYSTEMS AND TECHNIQUES FOR CHARACTER AND COMMAND RECOGNITION RELATED TO HUMAN MOVEMENTS

PRIORITY CLAIM

This application claims the benefit of U.S. Provisional Patent Application 61/259,288, filed Nov. 9, 2009, and entitled "INTELLIGENT COMPUTER SYSTEM AND TECHNIQUES FOR CHARACTER AND COMMAND RECOGNITION RELATED TO HUMAN MOVEMENTS", the entirety of which is incorporated by reference herein.

FIELD OF THE INVENTION

The present invention relates to a handheld computerized human hand gesture recognition system, and particularly to a handheld computer system that includes a handheld device having Micro Electro-Mechanical Systems (MEMS) based inertial sensors including a gyroscope and an accelerometer, and a miniature compass.

BACKGROUND OF THE INVENTION

A hand gesture is a form of non-verbal communication in which visible hand actions allow an individual to communicate messages. Hand gesture recognition is being increasingly used in computer technology, with the goal of interpreting human gestures via mathematical algorithms. Hand gesture recognition technology enables humans to interface with a computer and interact naturally without any mechanical devices. For example, using the concept of gesture recognition, it is possible to point a finger at the computer screen so that the cursor will move accordingly.

The hand gesture recognition concept is also being increasingly used in the video game technology, in which a player's hand gestures are communicated to a computer system by way of a handheld device. For example, Wii, a home video game console made by Nintendo Co. Ltd. uses a wireless controller, the Wii Remote, which can be used as a handheld pointing device and can detect movement in three dimensions. The Wii remote can study changes in acceleration over time to represent gestures.

There are many challenges associated with the accuracy and usefulness of conventional gesture recognition computer systems and software. Conventional systems are not highly accurate because they generally rely on linear sensors, whereas human hand gestures largely include angular movements. Thus, conventional systems can only properly recognize large hand movements and are unable to properly differentiate between hand gestures that are only slightly different from each other. It would be desirable to have recognition systems that can differentiate between similar hand gestures.

SUMMARY OF THE INVENTION

The following presents a simplified summary of the subject disclosure in order to provide a basic understanding of some aspects thereof. This summary is not an extensive overview of the various embodiments of the subject disclosure. It is intended to neither identify key or critical elements nor delineate any scope. Its sole purpose is to present some concepts in a simplified form as a prelude to the more detailed description that is presented later.

The present invention relates to novel and efficient handheld computer system and methodology for human hand gesture recognition. The computer system includes a remote handheld device that includes inertial sensors, for example, a gyroscope, an accelerometer, and/or a compass. In the training mode, a user makes an intentional hand gesture while holding the handheld device to communicate a command or a character. Data related to the gesture movement is captured and provided by the inertial sensors. The data is pre-processed, filtered and converted into a set of values corresponding to a set of discrete features. The set of values are stored in a database and a command or a character is associated with the set. The database is populated for various hand gestures. During operation, the same data capture and conversion steps are performed for a user's hand gestures, and the set of values is compared with the database. The command associated with the match or the closest match is executed, or the character associated with the match or the closest match is displayed on the display of the handheld device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIG. 9 illustrates an exemplary algorithm for the operating mode methodology of the present invention;

DETAILED DESCRIPTION

Figure 1:
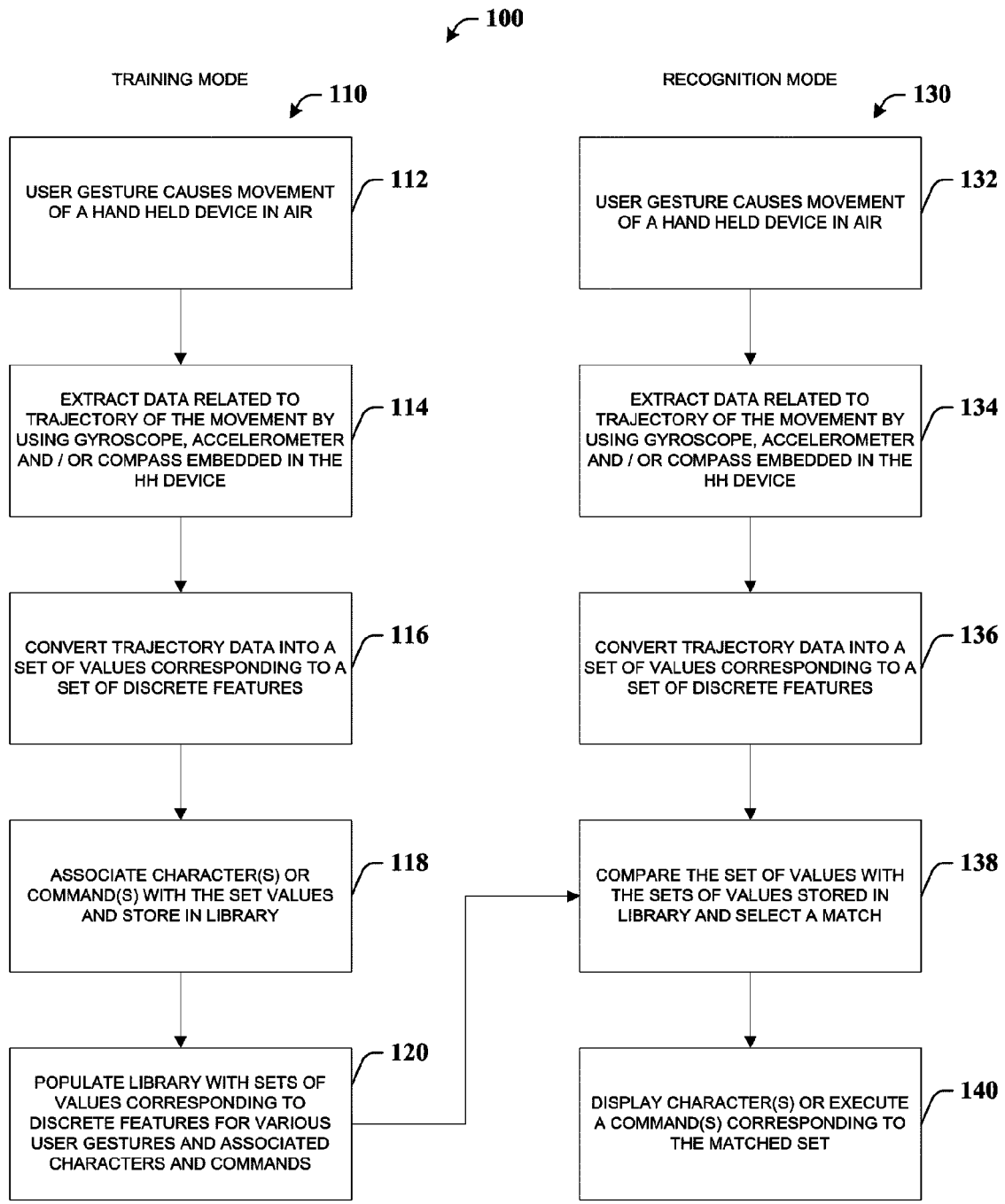
FIG. 1 illustrates an exemplary flow diagram for the methodology of the present invention.

This present invention discloses system(s) and techniques for recognizing, character(s) or commands intended by human movements, and displaying the characters or executing the commands. The claimed subject matter is now described with reference to the drawings, wherein like reference numerals are used to refer to like elements throughout. In the following description, for purposes of explanation, numerous specific details and examples are set forth in order to provide a thorough understanding of the subject innovation. One of ordinary skill in the art will understand, however, that the subject innovation may be practiced without these specific details and is not limited by these specific details and examples. One of ordinary skill in the art will also appreciate that well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" and "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

MEMS-based motion sensors include an accelerometer and a gyroscope. An accelerometer can be used to measure linear acceleration. The physical mechanisms underlying MEMS-based accelerometers include capacitive, piezoresistive, electromagnetic, piezoelectric, ferroelectric, optical and tunneling. MEMS-based accelerometers can be simple devices consisting of a cantilever beam with a predetermined test mass (also known as proof mass seismic mass). Under the influence of external accelerations, the mass deflects from its neutral position. This deflection is measured in an analog or digital manner. Commonly, the capacitance between a set of fixed beams and a set of beams attached to the proof mass is measured.

Other types of MEMS-based accelerometers can contain a small heater at the bottom of a very small dome, which heats the air inside the dome to cause it to rise. A thermocouple on the dome determined where the heated air reaches the dome and the deflection off the center is a measure of the acceleration applied to the sensor. MEMS-based accelerometers generally operate in-plane, that is, they are designed to be sensitive only to a direction of the plane of the die. By integrating two devices perpendicularly on a single die a two-axis accelerometer can be made. By adding an additional out-of-plane device, three axes can be measured. Accelerometers with integral electronics offer readout electronics and self-test capability.

A compass is an instrument used for determining direction relative to the earth's magnetic pole. It consists of a magnetized pointer free to align itself with the earth's magnetic field. Miniature compasses are usually built out of two or three magnetic field sensors, for example Hall sensors, that provide data for a microprocessor. The correct heading relative to the compass is calculated using trigonometry. Often, a miniature compass is a discrete component which outputs either a digital or analog signal proportional to its orientation. This signal is interpreted by a controller or microprocessor. The compass can use highly calibrated internal electronics to measure the response of the compass to the earth's magnetic field. Examples of miniature compasses available in the marketplace include the HMC1051Z single-axis and the HMC1052 two-axis magneto-resistive sensors sold by Honeywell International Inc., the AK8973 3-axis electronic compass sold by Asahi Kasei Microdevices Corporation, and the AMI 201 (2-axis) and the AMI 302 (3-axis) electronic compass modules sold by Aichi Micro Intelligent Corporation of Japan.

A gyroscope is a device used for measuring or maintaining orientation, based on the principles of conservation of angular momentum. MEMS-based gyroscopes use vibrating proof masses. Those masses typically vibrate at a high frequency. As the sensor housing rotates in inertial space a Coriolis force is induced on the proof mass. The Coriolis force causes a vibration in an orthogonal plane and the amplitude of the orthogonal motion can be measured. This type of device is also known as a Coriolis vibratory gyro because as the plane of oscillation is rotated, the response detected by the transducer results from the Coriolis term in its equations of motion ("Coriolis force"). A vibrating structure gyroscope can be implemented as a tuning fork resonator, a vibrating wheel or a wine glass resonator using MEMS technology.

One of ordinary skill in the art will appreciate that the present invention is not limited to MEMS based devices, that the MEMS based embodiments disclosed herein are exemplary, and that the present invention can be implemented with any accelerometer, compass and gyroscope that can be incorporated in a handheld device. One of ordinary skill in the art will appreciate that other types of inertial sensors that can be included in a handheld device, for example, quartz sensors, can also be used in the present invention. Other types of inertial sensors that include mechanical components on the micron or millimeter scale and can be combined with electronic circuitry can also be used in the present invention.

FIG. 1 illustrates an exemplary flow diagram 100 for the method of the present invention. The flow diagram 100 includes two components, a training mode component 110 and a recognition mode component 130. In the training mode 110, the user begins by causing an intentional movement of the handheld device in the air (Step 112). The user's intentional movement corresponds to a command or a character. In one embodiment, the handheld device can include MEMS-based gyroscope and accelerometer. In another embodiment, the handheld devices can include MEMS-based gyroscope and accelerometer and a miniature compass.

At step 114, the data related to the trajectory of the gesture made in Step 112 is extracted by using the gyroscope, accelerometer and compass embedded in the handheld device. As human movement is largely angular, a trajectory drawn in the air with the hand can be expressed primarily with angular movement using a gyroscope. The raw gyroscope data is proportional to angular velocity, so this data can be preprocessed to remove any offset and integrated to provide an estimate of angular movement. The gyro bias offset, also known as the null voltage, is the measured voltage when the gyro is not rotating about its sensitive axis. Gyro output voltage measurements above the bias offset indicate rotation in one direction (e.g., clockwise), while voltage measurements below the bias offset indicate rotation in the opposite direction (e.g., counter-clockwise).

Additional filtering to clean up the signal may remove involuntary hand jitter and other unwanted high frequency components. A jitter is a small and rapid vibration that is inherently present in a human hand. A dead zone or similar mechanism can be used to remove slow, unintentional movement. A dead zone in a sensor is the point, period, area or zone where a sensor does not work. InvenSense Inc., the assignee of the present patent application, has developed proprietary methodologies, software and architectures for calibrating and correcting errors in handheld devices having MEMS-based gyroscopes and accelerometers and/or miniature compasses. These innovations allow gesture recognition systems to interpret and differentiate between the various commands and characters intended by the user, even when different commands and characters are represented by hand gestures that are only slightly different from each other.

Returning to Step 114, the accelerometer data can also be used to help stabilize gyroscope bias, and to facilitate determining the direction of gravity. The accelerometer data can also be correlated with the gyroscope data to distinguish between rotation with a strong linear component, or moment arm, signifying intentional movement through the air, and rotational component without such component, signifying unintentional rotation of the device within the user's hand. A compass can also be incorporated in the handheld device to stabilize the gyroscope bias in the yaw direction. The result of this preprocessing is a trajectory containing X and Y data points corresponding to yaw and pitch angular movement. Pitch, roll and yaw refer to movements of an object that are measured as angles. Pitch is up and down like a box lid. Yaw is left and right like a door on hinges, and roll is rotation.

To help isolate the trajectory, in one embodiment, a button on the handheld device can be used to distinguish between intentional gesture movement and unintentional movement or wind-up movement. The button can be held down during the course of gesture, or it can be pressed once at the beginning of the gesture and once at the end. In another embodiment, the speed of the trajectory can be used to determine start and end of a gesture. For example, when the user begins a large, fast movement, a gesture is assumed to have begun. When some time passes and the total amount or speed of movement is reduced to below some threshold value, the gesture is assumed to have ended. In yet another embodiment, any movement is assumed to be a potential gesture movement, and a moving window of data is used to capture gestures.

As users may not be familiar with the experience of using hand movement to draw predetermined trajectories in the air, feedback can be used to help the user learn to control the trajectory. In this case, an image corresponding to the X and Y path of the trajectory can be displayed, for example, on a computer display, to notify the user of the trajectory that will be used in the gesture recognition algorithm. One of ordinary skill in the art would appreciate that it would useful to normalize the trajectory in space and time, such that it is suitable for storage, querying and comparison in a database structure. To normalize it in space, the trajectory can be scaled down by an amount or ratio determined by the maximum of the total X and Y spans. To normalize in time, averaging can be used to reduce the dumber of data points. After normalization, all trajectories would have the same size and the same number of data points, thereby making it easier to compare them by shape.

At Step 116, the trajectory data can now be converted to a set values corresponding to a set of selected discrete features. One example of a set of features is the angle of the trajectory at any given point in time. This can be calculated using the inverse tangent of a change in pitch divided by a change in yaw. Another example of a set of features is the radial squared component, comprising X squared plus Y squared. Another example of a set of features is the pitch component, comprising only the pitch, or Y data points. Another example of a set of features is the yaw component, comprising only the yaw, or X data points. Another example of a set of features is the rate of change of the trajectory, useful for distinguishing, for example, the letter "U" from the letter "V." Another example of a set of features is the location of a crossing point, useful for distinguishing, for example, the number "8" from the number "0." Another example of a set of features is the number of times within a trajectory in which the trajectory changes direction, with the limitation that the angular change in direction is greater than a threshold value. One of ordinary skill in the art will appreciate that other sets of similar types of features can also be used within the premise and objectives of the system of the present invention.

At Step 118, after a set of values corresponding to a predetermined set of discrete features has been created, the set of values can be stored in a database along with a corresponding identifier, for example, an ID number, indicating the desired gesture. At Step 120, the database can be populated with numerous sets of values corresponding to the desired features and associated with various identifiers and desired gestures. The following is an exemplary database that can be created in Step 120. The table below includes a set of N features and M sets of values for the N features. A command or a character is associated with each set of values.

|  | Feature 1 | Feature 2 | Feature 3 | ... | Feature N | Command/ Character |
|---|---|---|---|---|---|---|
| Set 1 |  |  |  |  |  |  |
| Set 2 |  |  |  |  |  |  |
| Set 3 |  |  |  |  |  |  |
| ... |  |  |  |  |  |  |
| Set M |  |  |  |  |  |  |

The database populated during the training mode 110 can then be used for gesture recognition mode during the recognition mode 130. In the recognition mode, at Step 132, the user makes a hand gesture either by moving the hand held device or just his/her hand in the air. At Step 134, the handheld device extracts data related to the trajectory of the gesture made in Step 132 by using the gyroscope, accelerometer and compass embedded in the handheld device.

At Step 136, the trajectory data extracted in Step 134 is converted into a set of values corresponding to some discrete features. Steps 134 and 136 can be implemented in the same or similar manner that Steps 114 and 116 in the training mode 110 are implemented respectively. At Step 138, the set of values that has been determined from the input trajectory in Step 136 can be compared to all sets of values stored in a gesture library or a subset of the sets of values stored in the gesture library. This library was generated by using training data in Step 120, or by using hard-coded data. At Step 140, upon identifying the set of values from the library that matches or most closely matches the set of values generated by the user's input trajectory, the character corresponding to that set of values is displayed or the command corresponding to that set of values is executed. The character can include a letter from an alphabet, which can be English or another language. One of ordinary skill in the art will appreciate that the term "character" as used can also include a word, a phrase or a signature. The character can also include a number, for example, a Roman numeral. The character can be displayed can be displayed in a word processing application document, for example, Microsoft Word.

At Step 140, to compare user input values set corresponding to a feature set with values sets corresponding to the feature set within the library, various techniques exist that can be used, including look-up tables, Hidden Markov Models (HMM), neural networks, and support vector machines. In the optimal embodiment, HMMs are used with some modification for optimization. An HMM includes a state transition matrix and an emission matrix. In the state transition matrix, a left-right model is used in which each state must be followed by the next state:

$$\begin{matrix} 0 & 1 & 0 & 0 & 0 & 0 & \text{etc.} \\ 0 & 0 & 1 & 0 & 0 & 0 & \text{etc.} \\ 0 & 0 & 0 & 1 & 0 & 0 & \text{etc.} \\ 0 & 0 & 0 & 0 & 1 & 0 & \text{etc.} \\ 0 & 0 & 0 & 0 & 0 & 1 & \text{etc.} \\ & & & \text{etc.} & & & \end{matrix}$$

In the emission matrix, the features from the library can be used to generate a matrix in which the optimal point in the matrix is given by each library value for a feature, but with some allowed probability on either side of the library value for a feature. For example, if a given state has been recorded with feature #4 for a given library feature set, the corresponding row in the emission matrix might include: 0 A B C B A 0 0 etc In which C corresponds to a high probability, and B and A correspond to respectively lower probabilities. This matrix may be generated using training methods such as the Baum-Welch method or may be entered directly from the feature library. After the state transition matrix and emission matrix have been generated, they may be used to evaluate the probability that input feature set values matches the library features set values using standard algorithms such as the forward algorithm or the Viterbi algorithm. The final probability may be generated as a log in order to prevent excessive scaling differences.

When several different feature sets are used to evaluate an input trajectory, a probability will be generated for each feature set. For example, probability A may reflect the probability for angular features, probability B may reflect the probability for radial features, and so on. A final probability can be given as a weighted linear combination of all the probabilities for all the types of features, in which the weights are determined experimentally. The highest probability determines best match for the trajectory; if the highest probability is below a threshold, then no match is returned.

In one embodiment, a set of short gestures may be pre-trained, such as a set of numbers, characters, or other trajectories of similar lengths. For each gesture, a set of different trajectories may be trained; for example, a 2 may be trained with or without a loop in the lower left corner. When a user inputs a trajectory that matches one of the predetermined feature sets, an event is triggered in the application or operating system of the device. In one embodiment, the gesture may trigger a mode change or event within an application or game. In another embodiment, the gesture may open or close an application, or otherwise control the set of applications running within an operating system. In another embodiment, a number or letter may indicate an element within a list within a program or operating system.

In one example, in a contact list within a phone, drawing a letter may indicate that the contact list should scroll to that letter within the alphabet. In another example, within a main menu, drawing a letter (such as 'W') may cause an application to start (such as a web browser). The list of predefined gestures may be preprogrammed by the vendor of the device, or trained by the user, or both.

In another embodiment, the trajectory to be matched may be an authentication signal used to unlock a device, unlock a program running on a device, or conclude a purchase or other financial transaction. Such an authentication signal is analogous to a signature, and may be longer than a simple character or number. Such an air signature may be an abstract set of shapes and curves, or may be a real signature drawn in the air. The trajectory drawn by the user may be stored in a database such that it can be viewed later if any conflict arises. It may also be matched to the user's predetermined air signature in real time, and the event intended to be triggered is successfully triggered only if the match probability is high enough.

To record an arbitrarily long trajectory as an air signature, it may not be sufficient to use a hard-coded number of features for all users' signatures, as some users may want to use a longer signature than others. In this case, the number of features to be used may be determined by the number of changes of direction within the signature.

In another embodiment, a hardcoded number of features can be used for all recognizable trajectories, with longer trajectories being made up of combinations of shorter trajectories. In this case, a long signature must be broken down into shorter units that are recorded and compared, with a long signature being recognized successfully only if it comprises a set of shorter trajectories that are successfully recognized in the correct order.

Figure 4:
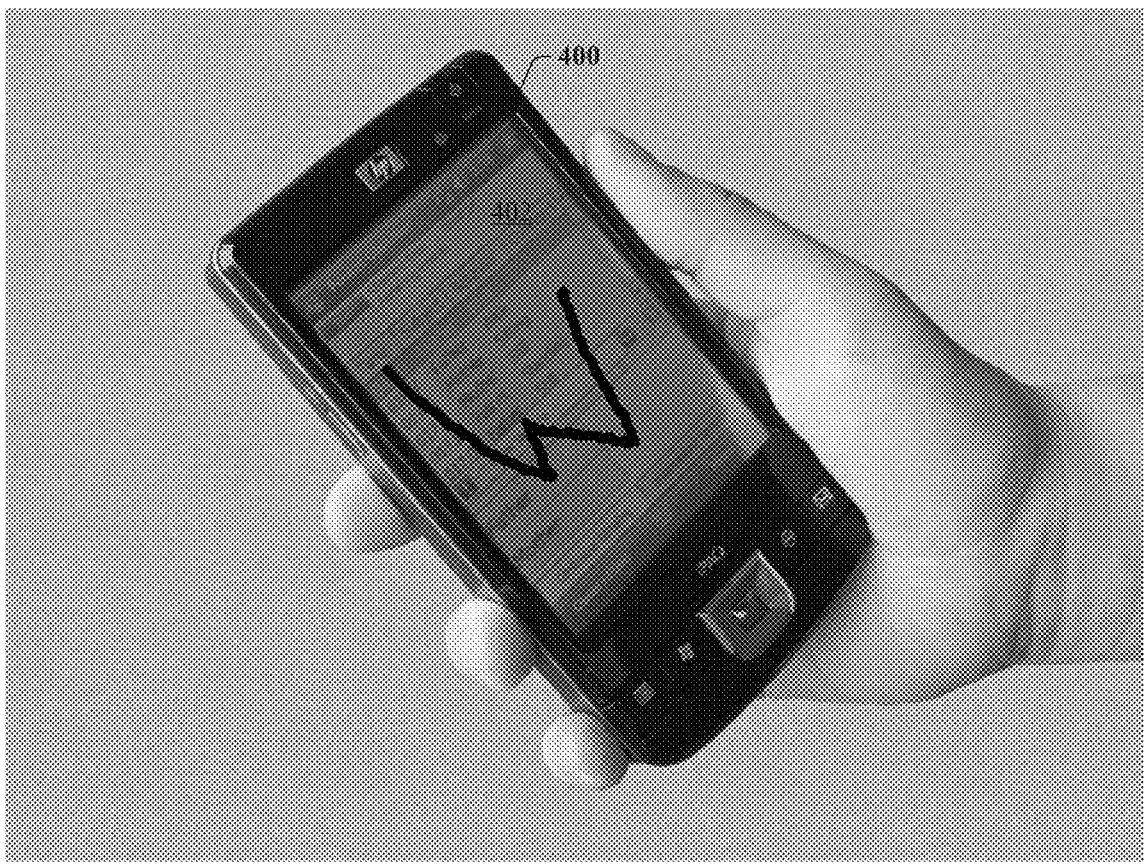
FIG. 4 illustrates an exemplary display for providing the user with a real time feedback.

In one embodiment, the device moved by the user incorporates both the motion sensors and the display on which the feedback trajectory and result of the gesture recognition may be drawn. In this case, the device may be a handset, a portable gaming system, or other electronic system comprising a set of motion sensors and a display. In another embodiment, the device may contain motion sensors but not the display, and a display that is physically detached from the device may indicate the feedback and results. For example, the device may be similar to a remote control, air mouse, or game controller, and the display may be a computer, TV, or game console monitor. FIG. 4 illustrates an exemplary display for providing the user with a real time feedback. In this example, the user drew the letter "W" in the air by moving the handheld device 400 and the display 402 displayed the trajectory in real time.

Figure 5:
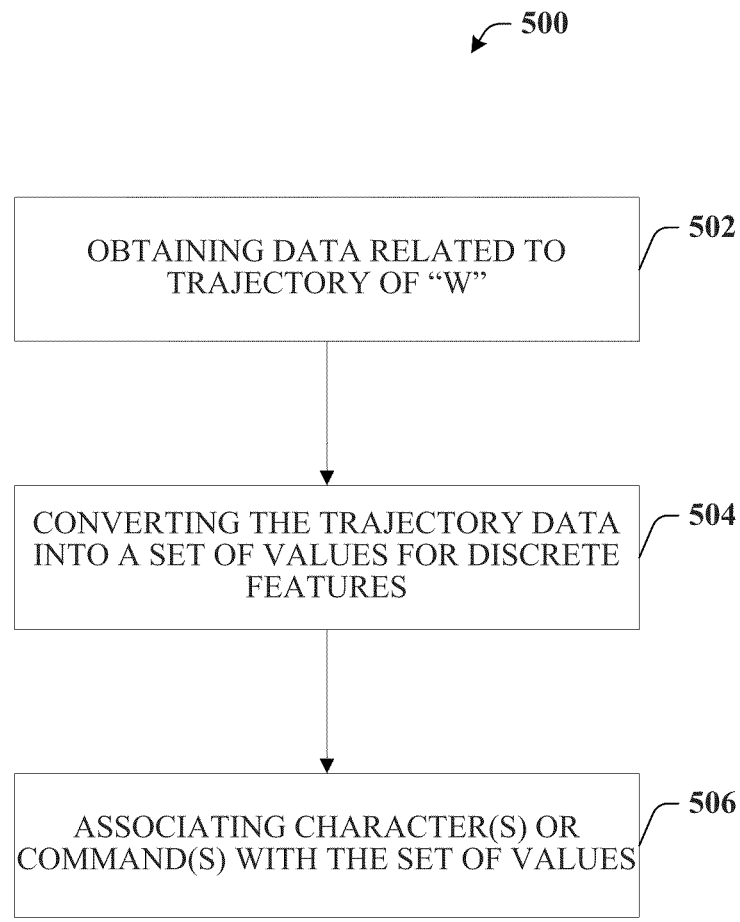
FIG. 5 illustrates an exemplary flow diagram for the training mode methodology of the present invention.

FIG. 5 illustrates an exemplary flow diagram 500 from the training mode methodology for the present invention. In this example, the user has drawn the letter "W" in the air while holding the handheld device. At Step 502, the inertial sensors inside the handheld device provide raw data related to the "W" trajectory. This data is pre-processed to remove noise etc. and normalized by a processor that can be inside or outside the handheld device. At Step 504, the trajectory data is converted into a set of values corresponding to a set of pre-determined discrete features. The types of discrete features included in the features set can be programmable and can be changed. As an example, one of the discrete features in the set can include the number of times the trajectory changes direction. In the case of the letter "W", the value of that feature would be three. The values are then stored in a database. At Step 506, a command or a character is associated with the set of values representing "W". In one example, "W" can represent the command to open or close a World Wide Web browser. In another example, "W" can simply represent that the character W, which would be typed, entered or displayed in an electronic mail or a word processing document. The character or command associated with a set of values can be user programmable.

Figure 6:
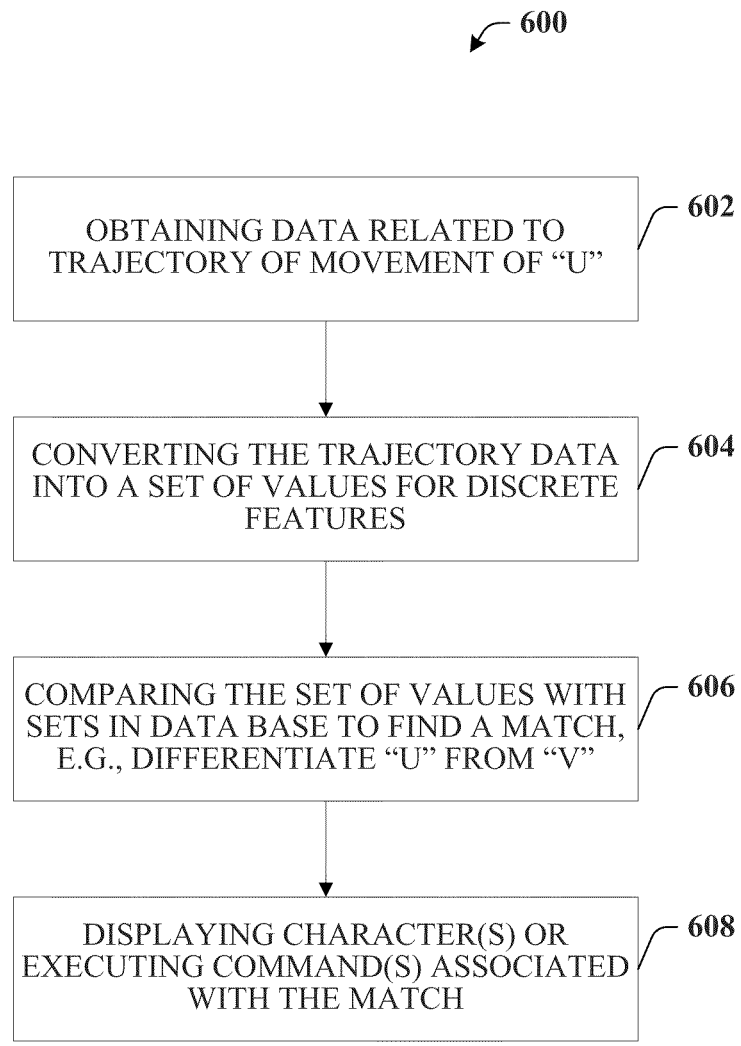
FIG. 6 illustrates an exemplary flow diagram for the recognition mode methodology of the present invention.

FIG. 6 illustrates an exemplary flow diagram 600 for recognizing gesture(s) according to the present invention. In this example, a user draws the letter "U" in the air while holding a handheld device including inertial sensors. At Step 602, the inertial sensors provide data related to the "U" trajectory. After pre-processing and filtering, at Step 604, the trajectory data is converted into a set of values corresponding to a selected group of discrete features. At Step 606, the set of values is compared with sets of values corresponding to the same group of discrete features and a match or a close match is found. As an example, the rate of change of the trajectory can be a useful feature here, as that would differentiate between "U" (slower change) and "V" (faster change). At Step 608, a command associated with "U" is executed or the letter "U" is displayed in an application.

Figure 7:
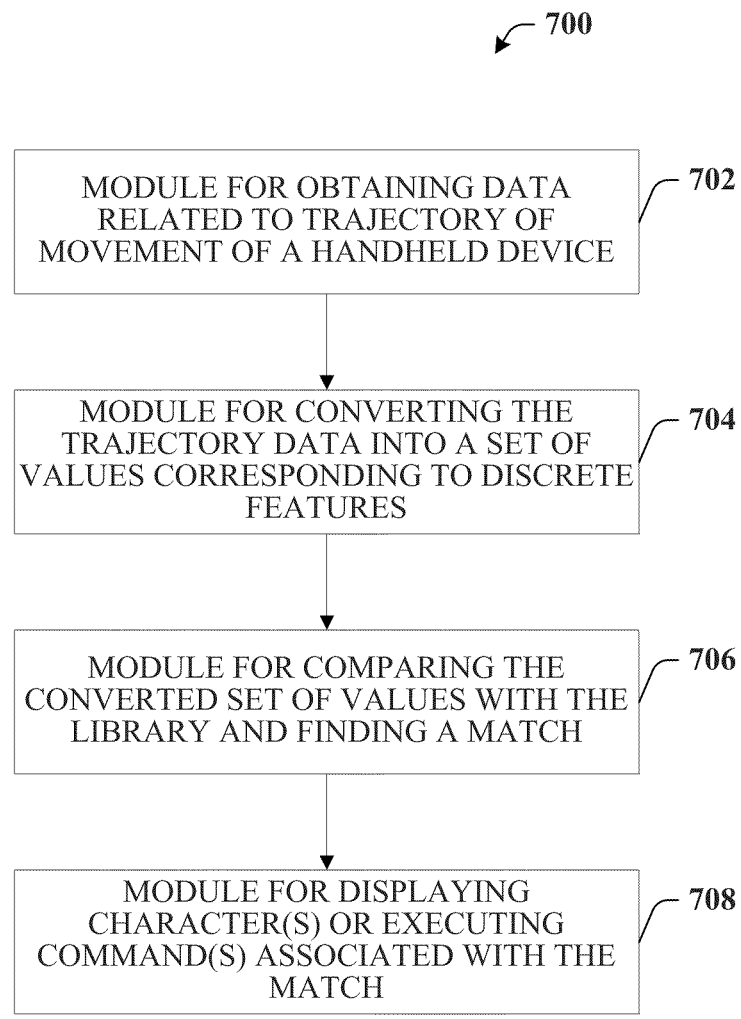
FIG. 7 illustrates exemplary computer modules that can be used by the gesture recognition engine of the present invention.

FIG. 7 illustrates exemplary computer modules that can be used by the gesture recognition engine 700 of the present invention. The engine comprises various modules for respectively: obtaining data related to trajectory of movement of a handheld device (702); converting the trajectory data into a set of values corresponding to selected discrete features (704); comparing the converted set of values with sets of values stored in a data store to find a match (706); and displaying character(s) or executing command(s) associated with the match (708). The modules 702-708 can be implemented in hardware, software or firmware. The modules 702-708 can be implemented on a single computer or multiple computers. The modules 702-708 can be programmable or hard wired.

In one embodiment, the trajectory drawn may be in the coordinate system of the handheld device. In this case, a vertically drawn 1 will be vertical relative to the earth if the user is standing up, but may be horizontal if the user is lying down. The trajectory will always be the same relative to the coordinate system of the handheld device.

In another embodiment, the trajectory drawn may be in the coordinate system of the earth or of a separate display not attached to the motion sensors. In this case, a vertically drawn 1 must always be vertical relative to the earth in order to be correctly recognized as a 1. In this case, because the gyroscope data is in the coordinate system of the device and not the earth, accelerometer data can be used to determine the direction of gravity and to process the gyroscope data. This can be done in real time using sensor fusion techniques or can be done in post-processing using look-up tables.

In cases in which the user cannot be expected to reliably draw the gesture in the correct coordinate system without some rotational error, the comparison algorithm may be run multiple times using slightly different angular offsets, with the best match chosen as the final probability. For example, a trajectory may be compared with a library features values sets with rotations of 0, 22.5 degrees, −22.5, 45, and −45.

The user or the device designer may also tune recognition thresholds in a variety of ways. Trajectories may only be valid if they are bigger in space than a certain threshold, or smaller than a certain threshold. They may only be valid if the execution time of the gesture is longer than a threshold or shorter than a threshold. They may only be valid if the speed of the gesture goes above a threshold or stays below a threshold. Each individual gesture may comprise independent thresholds, and may also comprise a final probabilistic scale factor that weights the gesture relative to other gestures, allowing an application designer to pick a gesture from two similar gestures that may be easier to trigger.

Figure 8:
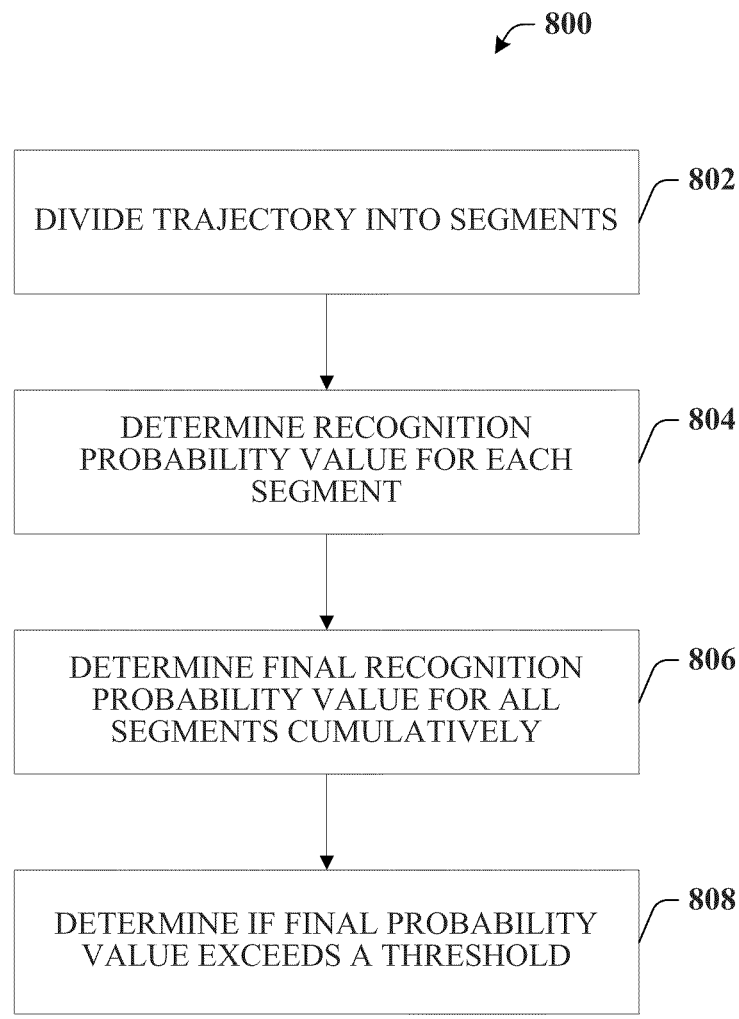
FIG. 8 illustrates an exemplary flow diagram for the operating mode methodology of the present invention.

According to an aspect of the present invention, in order to recognize longer gestures, a technique can be used in which long trajectories are broken down into segments, and each segment is treated like an individual trajectory. FIG. 8 illustrates an exemplary flow diagram for the methodology of the present invention for processing long gestures. According to the flow diagram 800, at Step 802, a trajectory made by the user by waving the handheld device is divided into segments. For example, a five letter cursive word can be divided into five segments. The number of segments can include a predetermined number or can be determined by analyzing the complexity of the entire trajectory; for example, calculating the number of changes of directions in the entire trajectory. At Step 804, a determination is made if each segment is recognized in the library, i.e. if each segment has a match in the library, within some probability threshold, and a probability value indicative of the certainty level of the match is assigned to the segment. If each individual segment has been recognized sufficiently, at Step 806, a final probability value, i.e. the probability value calculated for the entire trajectory cumulatively, is calculated. The final probability value can be calculated by combining the individual probabilities values in various ways; for example, averaging them, or multiplying them together. At Step 808, a determination is made if the final probability value meets or exceeds a final probability threshold.

Determining the final probability threshold that a user must exceed in order for a gesture to be recognized is difficult because different trajectories may require different thresholds, and different users may have different degrees of precision in their movement. The probability threshold determination can be automated if a gesture is trained several times. For example, if the gesture 'M' is trained five times, the library contains in its memory five iterations of the gesture 'M', called M1, M2, M3, M4, and M5. Since the user considers all five of these iterations to be the same gesture, it should be possible for the trajectory M1 to be recognized as M2, M3, M3 and/or M5 within the library. By checking the match probability of M1 versus M2, M1 versus M3, M1 versus M4, and so on, a set of match probabilities can be determined. The recommended probability at which a new 'M' should be recognized can be determined by combining all the individual match probabilities in some way; for example, in an average, or by choosing the minimum probability.

According to an aspect of the present invention, a user may want to train a gesture that includes multiple strokes with spaces in between; for example, when training a Chinese, Korean, or Japanese character as a gesture. In this case, a mechanism must be in place for determining which movements correspond to "strokes." For example, the handheld device can contain a button that, when held down, signifies that the user is "drawing" a stroke. When the button is not held down, this signifies that the user is traveling between strokes. A mechanism can also be in place that allows the user to see a cursor moving when the user's hand gesture is traveling between strokes, so that the required location of the start of the next stroke would be obvious. The user can therefore draw on a display a multi-stroke character using hand movement in the air.

During training, the each stroke can be stored as a gesture. The traveling movements can be stored as <x, y> vectors, signifying a straight line between the end of the previous gesture and the start of the new gesture. Each stroke can also have a vector signifying the straight line between the start of the stroke and the end of the stroke. During operation, all strokes and traveling vectors must match in order for the multi-stroke character to match. While the user is delivering strokes, an auto-complete feature can be active that attempts to match the first few strokes to a database of characters, and determines the most likely matches. When the number of auto-complete suggestions is sufficiently small, the user can simply select the correct character from the list. During operation, while a multi-stroke character can have a correct order and direction of strokes, the user may not necessarily draw the strokes in the right order or in the right direction relative to the manner in which the multi-stroke character was stored in the library during training. However, the gesture recognition engine of the present invention is able to determine that the resulting character still matches the desired character.

FIG. 9 illustrates an exemplary technique of the present invention for recognizing gestures including strokes. The training sequence 910 includes a sequence for a three stroke character with strokes A, B, and C. The training sequence 910 is also referred to as the correct stroke order. The correct stroke order 910 includes vectors vA (from the beginning of A to the end of A), vAB (travelling between strokes A and B), vB, vBC, and vC. All three strokes and five vectors would be matched using the desired machine learning technique, which could be HMM, neural network, support vector machine, or other similar technique.

During operation, the same character including the strokes A, B and C can be drawn in a different, or wrong, order. If a character is drawn with the strokes in the wrong order 920, for example, B, A, C, this character can also be matched against a transformed version of the stored character in the library. By comparing the character with the strokes B, A, and C, and the vectors vB, vBA, vA, vAC, and vC, a match can be acquired. The new vectors can be calculated by using simple vector math: vAC=vAB+vB+vBC, and vBA=−vB−vAB−vA. In addition, if a character is drawn with one or more strokes drawn in the wrong direction, a match can be made by reversing the individual strokes and testing the result against the stored library. In this manner, a search may be done in which every combination of stroke order and direction can be tested until a match is found in the library or no match is found.

According to an aspect of the present invention; inertial sensors including gyroscopes are used to provide enhanced power management for a handheld device. Power management refers to turning off power or switching a system, a component, a function or an application to a low-power state when inactive. Power management for handheld devices is desired, to increase battery life, reduce cooling requirements, reduce noise, and reduce operating costs for energy and cooling. Lower power consumption also means lower heat dissipation, which increases system stability, decreases energy use, decreases costs and reduces the impact on the environment.

Figure 10:
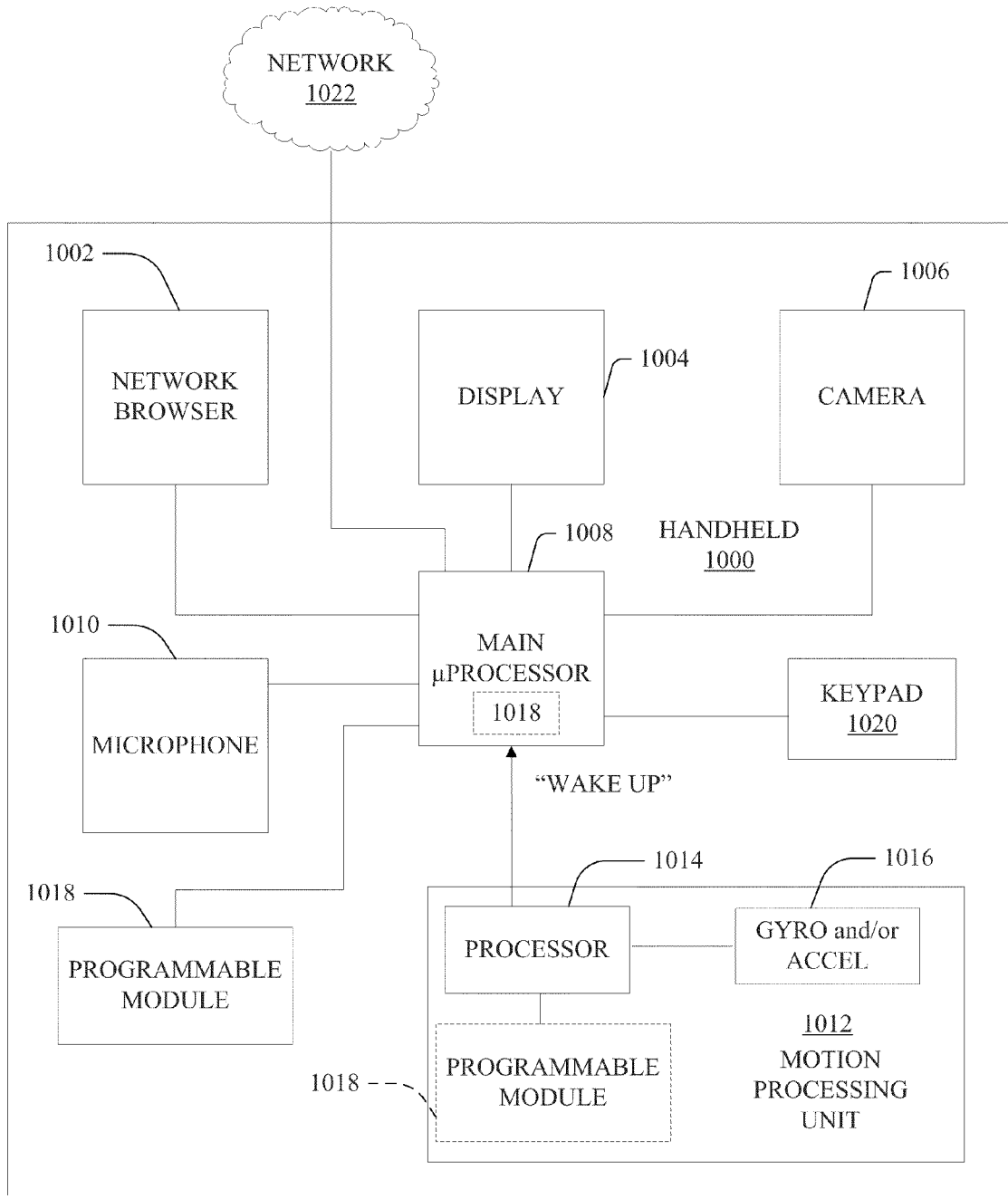
FIG. 10 illustrates a system according to an exemplary embodiment of the present invention, in which the inertial sensors are used for power management.

FIG. 10 illustrates a system according to an exemplary embodiment of the present invention, in which the inertial sensors are used for power management. The handheld device 1000 includes the main microprocessor 1008 coupled to the motion processing unit 1012. The motion processor unit 1012 includes the processor 1014 coupled to the inertial sensor module 1016, which can include a gyroscope, an accelerometer or both. The inertial sensor module 1016 can also include a compass. The processor 1014 controls the gyro and the accelerometer 1016 and processes the information (or data) provided by the gyro and the accelerometer 1016. The processor 1014 can also be coupled to a compass for controlling the compass and processing information provided by the compass. The processor 1014 is also coupled to the programmable module 1018 and the main microprocessor 1008. The programmable module 1018 can also be included as a software module in the main microprocessor 1008. The programmable module can also be included in the motion processing unit 1012.

The main microprocessor 1008 is primarily responsible for managing the operations of the components of the handheld device 1000. The microprocessor 1008 is coupled to the applications (or components) including the network browser 1002 (e.g., an Internet browser), the display 1004, the camera 1006, the microphone 1010 and the keypad 1020. The main microprocessor 1008 is also coupled to the programmable module 1018. The programmable module 1008 is coupled to the keypad 1020 and the network 1022 by way of microprocessor 1008. The keypad 1020 can include the keypad for a smart phone from which the user can program the programming module 1018. The network 1022 can include a wired, wireless or optical network, the Internet, a local area network (LAN) or a computer from which the programming module 1018 can be programmed.

The display screen 1004 is an essential user interface component and is essential for operating smart phones. The display 1004 is also one of the components of the handheld device 1000 that consumes the most battery power. According to an aspect of the present invention, the motion processing unit 1012 is used to alleviate the handset's 1000 dependency on the display 1004. As illustrated in FIG. 10, the gyro processor 1014 and the gyro 1016 are placed in a dedicated power partition, separated from the display 1004 and the main processor 1008. The electrical power consumption of the inertial sensors 1016 is much less than the electrical power consumption of the display 1006 in terms of order of magnitude.

Figure 11:
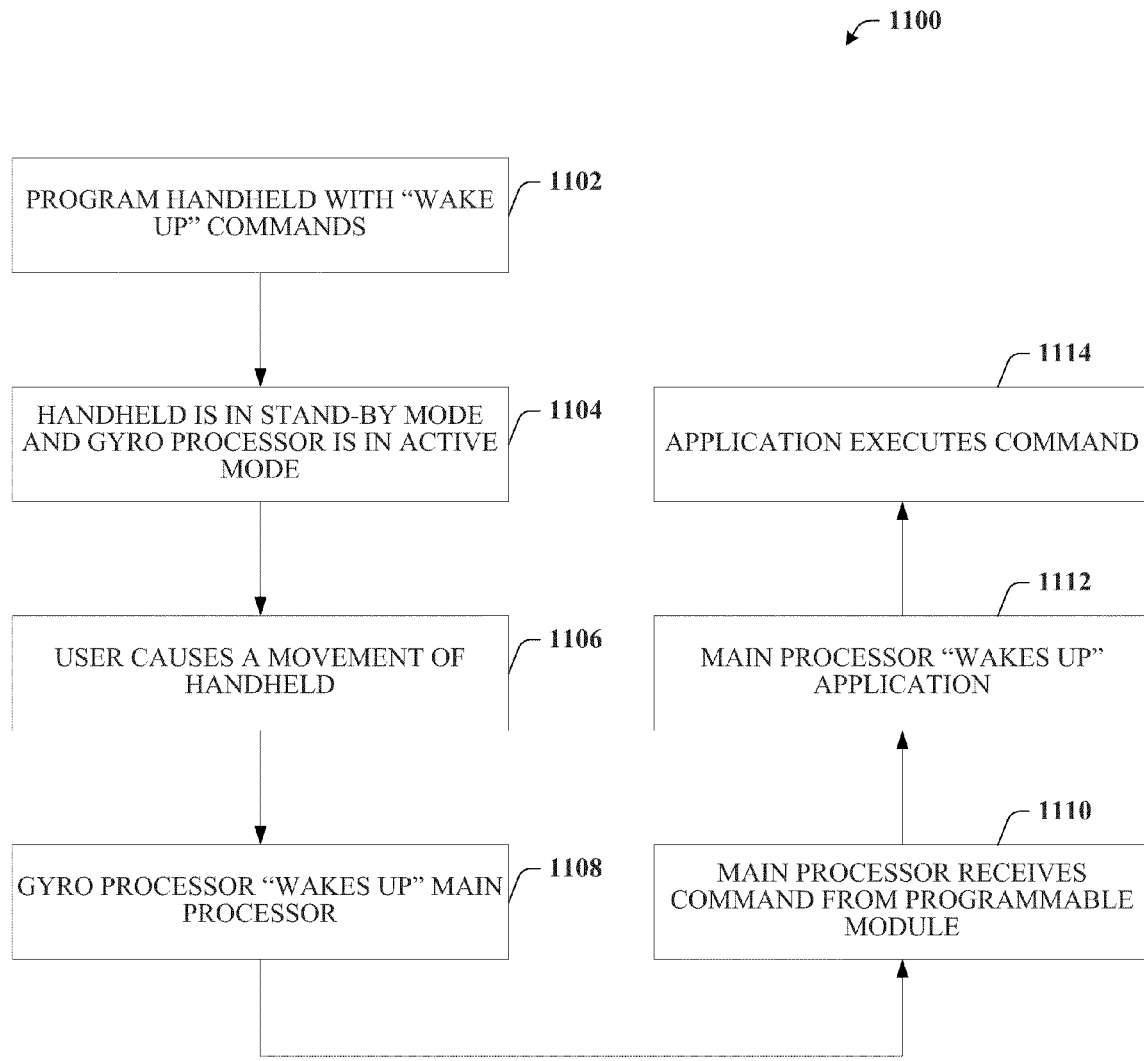
FIG. 11 illustrates an exemplary power management methodology of the present invention.

FIG. 11 illustrates an exemplary power management methodology of the present invention. According to the flow diagram 1100, at Step 1102, the programmable module 1018 is programmed to recognize various "wake up" commands. "Wake up" refers to switching a component of the handheld device 1000 from a low-power (i.e. turned off) mode to a high-power (i.e. turned on) mode of operation. The programmable module 1018 can be programmed by the user by using the keyboard 1020. The programmable module 1022 can also be programmed remotely over the network 1022. For example, the "wake up" commands can be uploaded to the programmable module 1022 by way of the Internet.

The programmable module can include a look-up table including various hand motions and their corresponding commands. Examples of the motion commands can include a shake action or a special moving pattern (i.e. a signature) representing the command to answer the phone, a handwriting motion of the letter "C" representing the command to turn on the camera, a hand gesture to unlock the phone, a hand gesture to speed dial a phone number, and hand motions representing other user-specified shortcuts. For certain motion commands, for example, answering the phone and speed dialing a phone number, the display 1004 and the touch panel 1020 can remain turned off.

At Step 1104, the handheld device 1000 is in the stand-by (or sleep, low-power or turned-off mode). The device 1000 can enter into the sleep mode because, for example, the device 1000 has been idle for more than a pre-determined period of time. The sleep mode refers to a low power mode in which the handheld device 1000 significantly reduces its power consumption, but allows the device 1000 to immediately resume operation (i.e. switch back to active mode) without requiring the user to reset the programming codes or waiting for the handheld device 1000 to reboot. In the sleep mode, the network browser 1002, display 1004, the camera 1006 and the microphone 1010 are turned off and the main microprocessor 1008 is throttled down to its lowest-power state. However, according to an aspect of the present invention, the motion processing unit 1012 remains running (i.e. active) when the handheld device 1000 is in the sleep mode and continues to monitor for any motion commands.

At Step 1106, the user causes a movement of the handheld device 1000 representative of the user's desired command. The movement trajectory is detected by the gyro 1016. In one embodiment of the present invention, the gyro 1016 generates data representative of the motion trajectory and provides it to gyro processor 1014. The gyro processor 1014 communicates with the programmable module 1018 to identify the command or commands corresponding to the motion trajectory data. The gyro processor 1014 provides the main microprocessor 1008 with a wake up signal (Step 1108) and the identification of the user's motion command or commands. In response to the wake up signal, the main microprocessor 1008 switches from the sleep mode to the active (or high-power) mode of operation.

In another embodiment of the present invention, the gyro processor 1014 provides the main processor 1008 with the wake up signal and the data related to the user's motion's trajectory. The wake up signal causes the main microprocessor 1008 to switch from the sleep mode to the active mode (Step 1108). At Step 1110, the main microprocessor 1008 communicates with the programmable module 1018 to identify the command or commands corresponding to the gyro data. At Step 1112, the main microprocessor 1008 wakes up the application or applications (i.e. causes them to switch from the sleep mode to the active mode) that are required to execute the command or commands. At Step 1114, the main microprocessor 1008 and the now-active application or applications execute the command or commands. The present invention thus uses a motion trigger, instead of a push (or soft) button on the handheld device, to wake up the handheld device.

Figure 12:
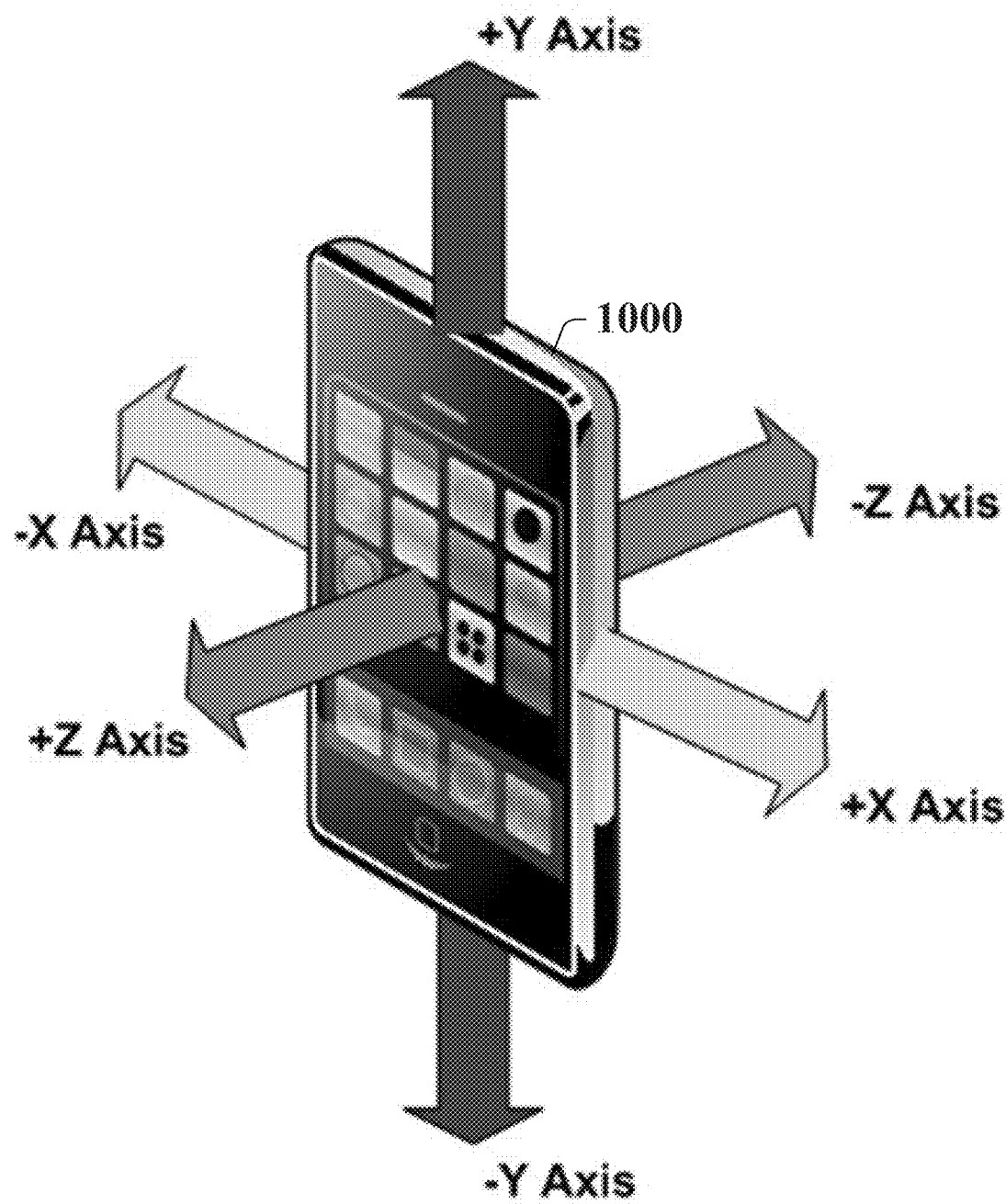
FIG. 12 illustrates an exemplary handheld device in which the power management techniques of the present invention can be implemented.

In one embodiment of the present invention, only the gyro 1016 is used to detect the user's motion. Gyros detect angular movements. Because human hand movement is mostly angular and because even linear hand movements are generally accompanied by angular movements, the gyro 1016 is well suited for detecting hand motions. As illustrated in FIG. 12, the gyro 1016 can detect any rotational or angular motion around the X, Y and Z axis of the handheld device 1000. Thus, the present invention provides the user with a 360 degree freedom along all three axes (X, Y and Z) to program, detect and execute motion commands for the handheld device 1000. In another embodiment of the present invention, the user's motion trajectory is detected by both the gyro 1016 and an accelerometer included in the motion processing unit 1012. The gyro 1016 is used for detecting angular movements associated with the trajectory and the accelerometer is used for detecting the linear movements associated with the trajectory. In this embodiment, the processor 1014 can process both the gyro and accelerometer data.

According to an aspect of the present invention, the motion processing unit 1012 is used as a user interface for detecting a user hand movement. In an exemplary embodiment of the present invention, the motion processing unit 1012 is a sub system of the main microprocessor 1008. In another embodiment of the present invention, the motion processing unit 1012 is directly controlled by the main microprocessor 1008. In both embodiments, the main microprocessor 1008 and the motion processing unit 1012 remain in the active mode even when the applications 1002, 1004, 1006, 1010, 1018 and 1020 enter into the sleep mode, for example, because the handheld device 1000 has been idle for longer than a predetermined amount of time.

Thus, unlike the embodiment disclosed in FIG. 11, in these embodiments, the main microprocessor 1008 does not need to be awaken-ed as it remains in the active mode. In response to detecting a movement of the handheld device 1000, the main microprocessor 1008—MPU 1012 system automatically performs at least two or all of the following functions: authenticate the user, identify the command associated with the movement, wake up (i.e. switch from sleep to active mode) the relevant application(s) and execute the command(s) by using the now awakened application(s).

In the conventional art, for a handheld device such as a mobile phone, to cause the handheld device to switch from sleep to active mode, a user must push a button on the keypad (or touch panel) of the handheld device. That causes the high power consuming display of handheld device to switch to active mode, even if the functionality the user desires to perform does not require the use of the display. For example, if the user is in a meeting and desires to audio tape a portion of the meeting using his/her smart mobile phone, in the conventional art, the user must first awaken the display and then select the audio taping application for example, by pressing soft or hard key(s) for selecting the audio taping application, even though the display is not needed for audio taping. Thus, conventional art causes wastage of power and time and requires multiple actions by the user.

According to the embodiments of the present invention, the user only needs to make a single predetermined gesture, for example, an air trajectory in the form of the letter "R" to convey his/her desire to make an audio recording of the meeting. In response to the "R" motion of the handheld device 1000, the main microprocessor 1008—MPU 1012 system would automatically communicate with the programmable module 1018 to determine that the user desires to activate the audio taping application, make a function call to the audio taping application to wake up the audio taping application components including, for example, the microphone, and begin the audio recording of the meeting. All of the above steps are performed automatically in response to the single "R" gesture by the user, and, are performed without awakening irrelevant applications such as the display 1004. The present invention provides advantages over conventional art in the form of reduced number of steps, less power consumption and reduced time to perform the desired function.

Figure 13:
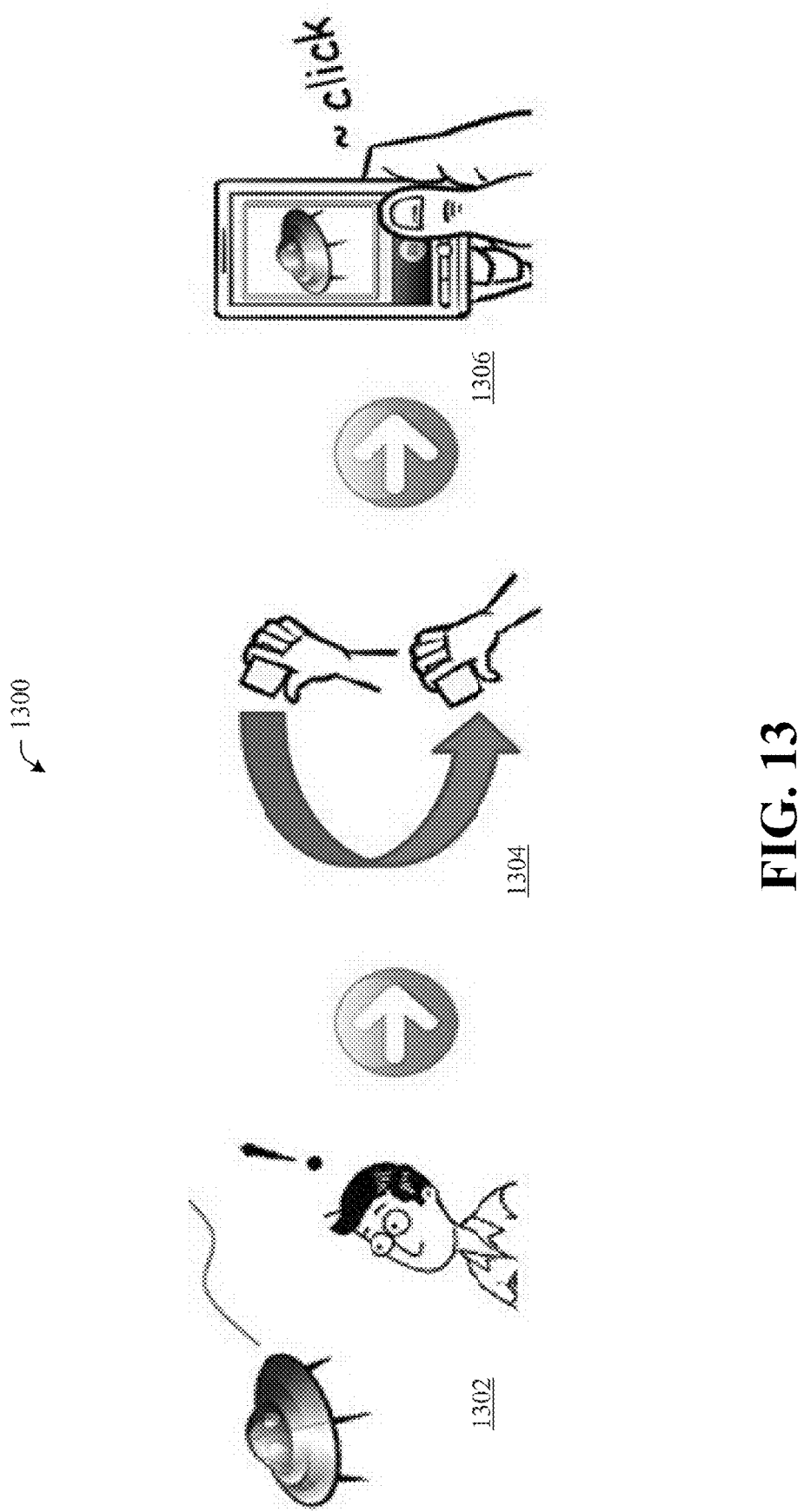
FIG. 13 illustrates an exemplary methodology of the present invention in which the camera application is switched from the sleep mode to the active mode.

FIG. 13 illustrates an exemplary methodology of the present invention in which the camera application is switched from the sleep mode to the active mode. According to the flow diagram 1300, at Step 1302, the handheld device 1000 is in the sleep mode and the user sees an object that the user would like to photographer. At Step 1304, the user makes a "C" hand gesture in the air while holding the handheld device 1000. The user can make the "C" gesture by rotating his/her wrist. The gyro 1016 detects the "C" gesture and provides the trajectory data to the gyro processor 1014. In one embodiment, the gyro processor 1014 wakes up the main microprocessor 1008. In another embodiment, the main microprocessor 1008 is configured to remain in the active mode when the device 1000 is in the sleep mode and directly control the gyro processor 1014. The main microprocessor 1008 communicates with the programmable module 1018 and identifies the command corresponding to the "C" gesture to include "turn on the camera."

At Step 1306, the main microprocessor 1008 causes the camera application 1006 to switch from sleep to active mode. The main processor 1008 can also cause the display 1004 to switch from sleep to active mode, depending on the motion commands included in the programming module 1018. The network browser 1002 and the microphone 1010 remain in the sleep mode. If the display 1004 is not turned on, the user can view the object by using the view finder of the camera and use the click button to capture the photograph. If both the camera 1006 and the display 1004 are turned on, the user can then view the object on the display 1004 and take the photograph by using the click button. The present invention provides the capability to wake up devices and applications inside a handheld device without requiring push button(s), and specifically by using the movement of the handheld device as a trigger to wake up the devices and applications.

Figure 14:
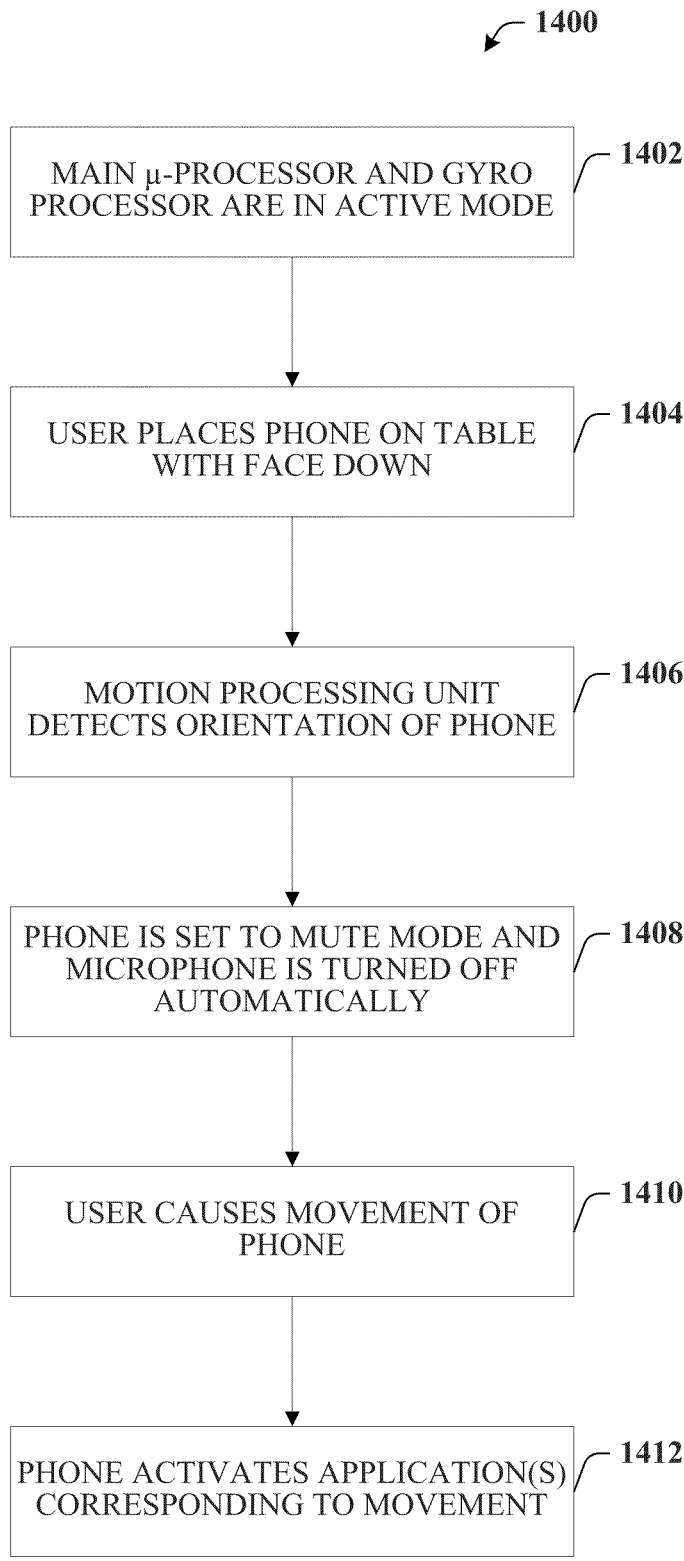
FIG. 14 illustrates an exemplary methodology of the present invention in which the handheld device is switched from the active mode to the sleep mode and back to the active mode.

FIG. 14 illustrates an exemplary methodology of the present invention in which the handheld device is switched from the active mode to the sleep mode and back to the active mode. According to the flow diagram 1400, at Step 1402, the main microprocessor 1008 and the gyro processor 1014 of the smart phone 1000 are in the active mode. At Step 1404, the user places the phone 1000 face down on a table top, i.e., display screen 1004 and the keypad 1020 of the phone 1000 are face down. At Step 1406, the motion processing unit 1012 detects that the orientation of the phone 1000 is face down. At Step 1408, based on the face down orientation of the phone 1000, the processor 1014, the main microprocessor 1008 and the programmable module 1018 cause the microphone (or speaker) 1010 to be turned off and the phone to be set in the mute mode.

At Step 1410, the user causes a movement of the phone 1000, for example, by tapping anywhere on the phone twice to indicate that the user wants answer an incoming phone call. The small angular movement of the phone 1000 that would result from the tapping is detected by the gyro 1016. In response, at Step 1412, the gyro 1016, the gyro processor 1014, the main microprocessor 1008 and the programmable module 1018 cause the phone 1000 to return to the non-mute active mode and turn on the microphone 1010.

Figure 15:
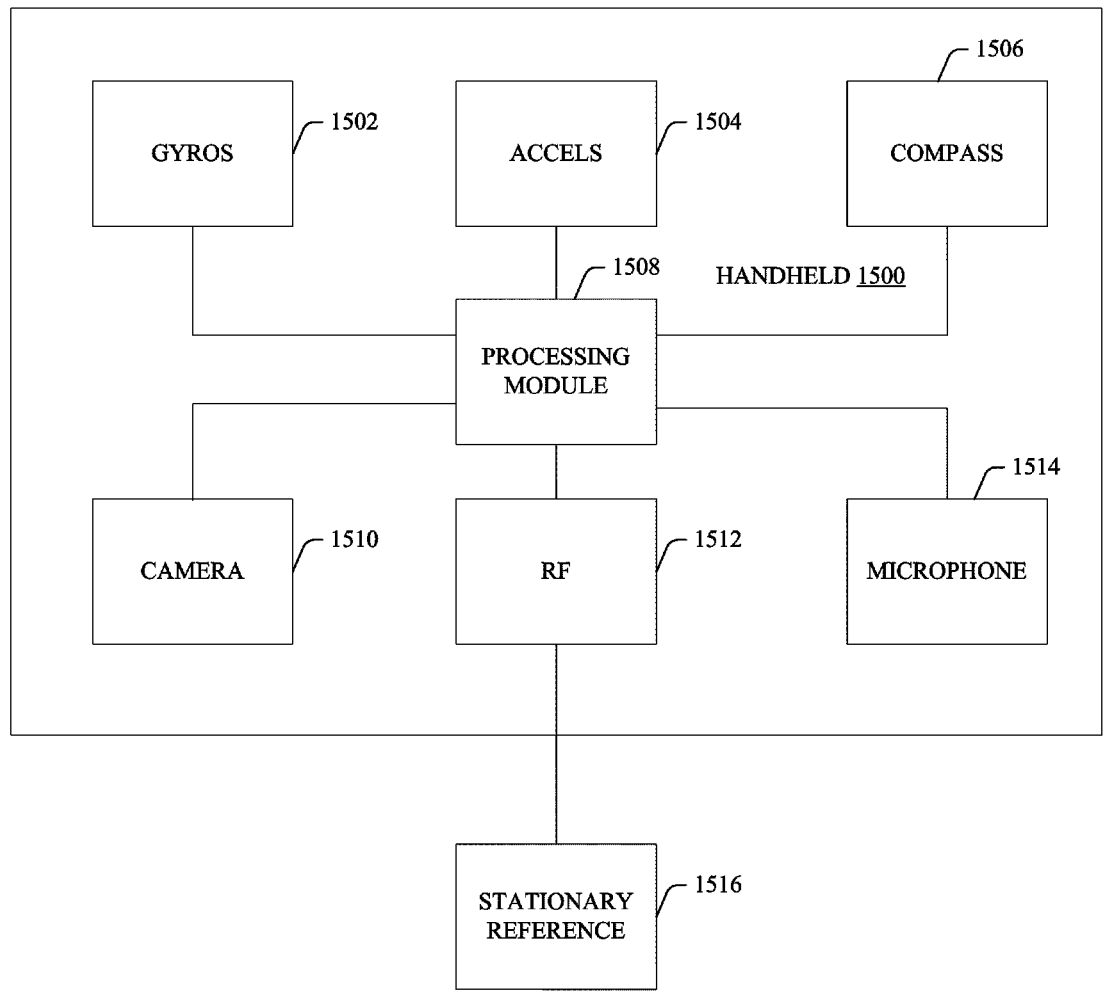
FIG. 15 illustrates an exemplary handheld device of the present invention including inertial and non-inertial sensors.

According to an aspect of the present invention, inertial sensors are used in combination with other sensors to perform user authentication. FIG. 15 illustrates an exemplary handheld device of the present invention including inertial and non-inertial sensors. The handheld device 1500 includes three types of inertial sensors: gyroscopes (1502), accelerometers (1504) and a compass (1506). In other embodiments, the handheld device can include either only gyroscopes (1502) or gyroscopes (1502) and accelerometers (1504). The handheld device 1500 also includes other sensors including a camera 1510, RF sensors 1512 and a microphone 1514. In other embodiments, the handheld device 1500 can include only one or two of these non-inertial sensors 1510, 1512 or 1514. The processing module 1508 can include a microprocessor and memory and is used to process information provided by the sensors 1502, 1504, 1506, 1510, 1512 and 1514.

In an embodiment of the present invention, inertial sensors including one or more gyroscopes, accelerometers and/or compasses, and memory and microprocessor for controlling the inertial sensors are located on a substrate. The substrate can also include an interrupt module to trigger the applications processor for the handheld device in response to motion detection by the inertial sensors.

Figure 16:
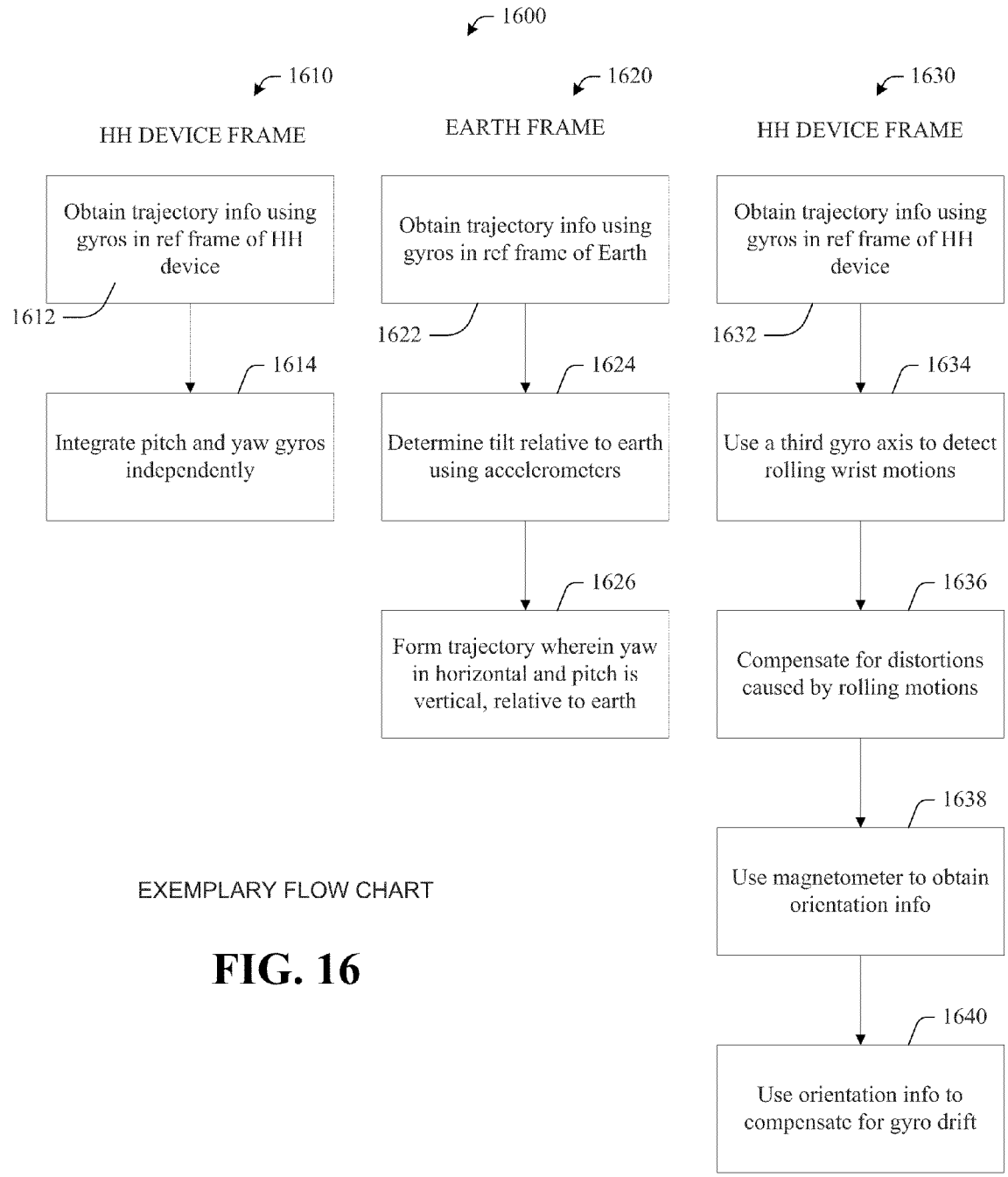
FIG. 16 illustrates an exemplary methodology of the present invention for combining data provided by the inertial sensors.

FIG. 16 illustrates an exemplary methodology for combining the data provided by the gyroscopes with the data provided by other inertial sensors. The flow diagram 1600 includes the sub-flow diagrams 1610, 1620 and 1630. According to the flow diagram 1610, the trajectory information for the handheld device 1500 can be obtained from the gyroscopes 1502 in the reference frame of the handheld device 1500 including the gyroscopes 1502 (Step 1612). In this case, it can be sufficient to integrate the pitch and yaw gyroscopes 1502 independently without the use of other sensors, although the other sensors can still be used to calibrate the gyroscopes 1502 (Step 1614).

According to the flow diagram 1620, the trajectory information can be obtained from the gyroscopes 1502 in the reference frame of the Earth (Step 1622). In this case, accelerometers 1504 can be used in addition to gyroscopes 1502 in order to determine the tilt of the handheld device 1500 relative to the Earth (Step 1624), and form a trajectory in which yaw is horizontal relative to the Earth and pitch is vertical relative to the Earth (Step 1626).

According to the flow diagram 1630, the trajectory information can be obtained from the gyroscopes 1502 in the reference frame of the handheld device 1500, without the use of accelerometers 1504 for tilt compensation (Step 1632). However, a third gyro axis can be used to detect rolling wrist motions (1634), and compensate the trajectory for any distortions due to this rolling motion during the trajectory (Step 1636). A magnetometer 1506 can also be used to measure the Earth's magnetic field, providing a fixed measurement of orientation (Step 1638) that can be used to compensate for any gyroscope 1502 drift (Step 1640).

Figure 17:
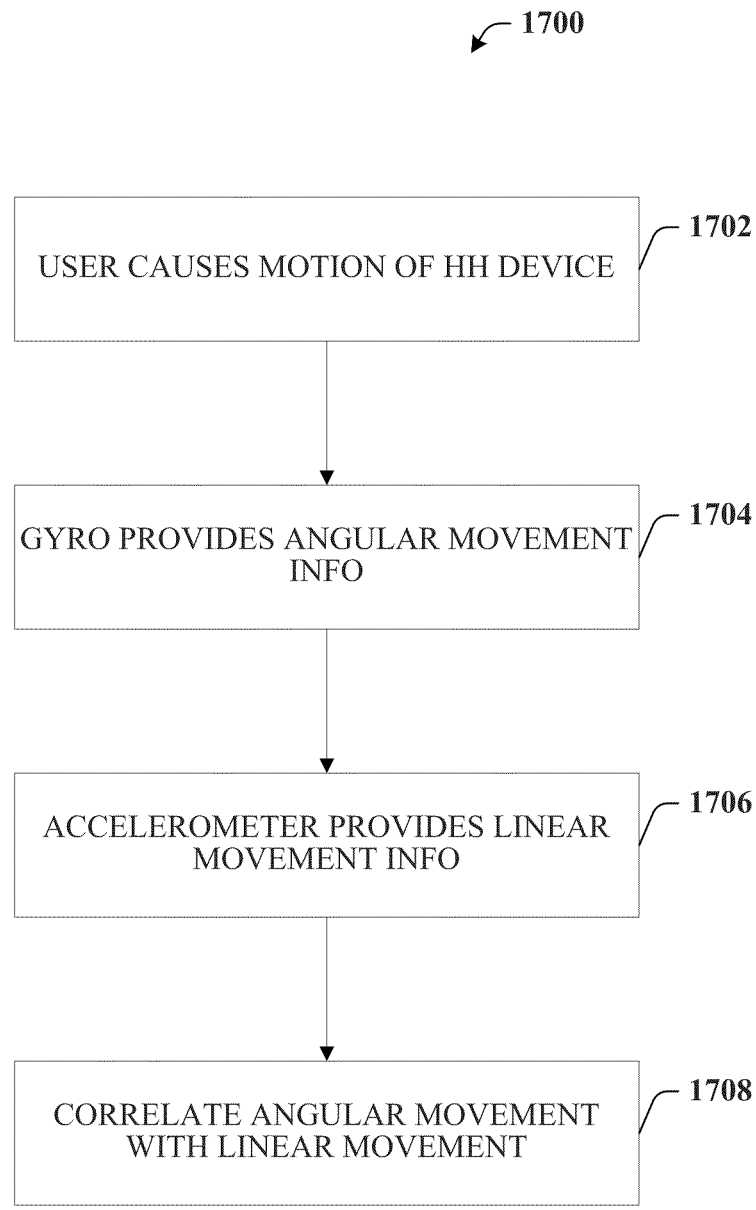
FIG. 17 illustrates an exemplary methodology of the present invention in which angular movement is correlated with linear movement.

FIG. 17 illustrates an exemplary methodology of the present invention in which angular movement is correlated with linear movement. According to the flow diagram 1700, at Step 1702, a user causes a movement of the handheld device 1500. While human body movement is primarily angular, and thus well suited to gyroscope based motion tracking, users may perform trajectories that include a lot of linear motion due to their habits or experiences with linear writing such as writing on a blackboard or writing on a piece of paper with a pencil, both of which are primarily linear. Because human bodies are joint based, linear movement will almost always be accompanied by angular movement.

At Step 1704, gyro(s) 1502 are used to obtain information related to the angular movement of the handheld device 1500. At Step 1706, accelerometer(s) 1504 are used to obtain information related to the linear movement of the handheld device 1500. After sensor fusion between accelerometers 1504 and gyroscopes 1502, linear acceleration can be extracted and double integrated to determine positional changes. However, due to inaccuracies in the sensors, the double integration can be unstable and may not lead to accurate information about linear movement. The angular movement, even if it is small, can be used to determine the movement direction and quality, due to the fact that angular movement does not require double integration. By correlating angular movement with linear movement, a final trajectory can be calculated that is usable even if the linear movement that occurs during the angular movement is much smaller (Step 1708).

Returning to FIG. 15, according to an aspect of the present invention, the camera 1510 can be used as a motion sensor in order to augment the trajectory formation. The camera 1510 based motion tracking can use existing techniques such as cross-correlation, feature tracking, optical flow, and face tracking. These techniques can provide pixel movement information that can be used for trajectory formation. While camera 1510 based tracking is usually not reliable by itself, it can be used in combination with accelerometers 1504 and gyroscopes 1502 in order to provide stable motion tracking. By using gyroscopes 1502 to extract the amount of pixel movement that correlates with angular movement, the remaining pixel movement can be identified as correlating with linear movement.

A sensor fusion algorithm can be used that uses accelerometer 1504 data over short linear distances and camera 1510 pixel tracking over long linear distances in order to provide a more accurate linear trajectory. The camera 1510 tracking can help stabilize the rotational movement by reducing drift. The gyroscopes 1502 and accelerometers 1504 provide more accurate movement information over short periods of time, and help reject disturbances from lighting changes or moving objects within the camera's 1510 field of view.

According to an aspect of the present invention, RF (radio frequency) sensors 1512 within the handheld device 1500 may also be used for motion tracking by tracking the magnitude of the RF signal and, in some cases, the direction of the RF signal, relative to some external reference 1516, such as a RF network, a stationary computer system, or another similar device. The RF signal can include a Bluetooth, Wi-Fi, GPS, infrared, or some other RF signal. The signal tracking can be used to compliment the other motion sensors by providing a fixed reference to some outside reference frame. The RF signal can be sent out by the handheld device 1500, or received by the handheld device 1500, or both.

In one embodiment, the same infrared RF signal can be used to compliment the motion sensors and also serve as a proximity sensor used to determine, for example, if a user's face is near the touch screen. In another embodiment, a separate infrared signal can be used for each purpose. The RF signal can also be used for other transmission purposes such as controlling a TV, computer, media center, or home automation system. The RF signal can be picked up by a dedicated antenna, or by a magnetometer that also serves to measure the Earth's magnetic field.

According to an aspect of the present invention, information from the motion tracking sensors is combined with information from other sensors that determine context. The context is used to determine if a command should be executed, the nature of the result of the command, or the set of commands that are available. Such context measuring sensors can include location sensors such as a global positioning system (GPS), RF sensors that determine the location of the device within an RF network, a touch screen, temperature sensors, a proximity sensor, or a microphone.

Figure 18:
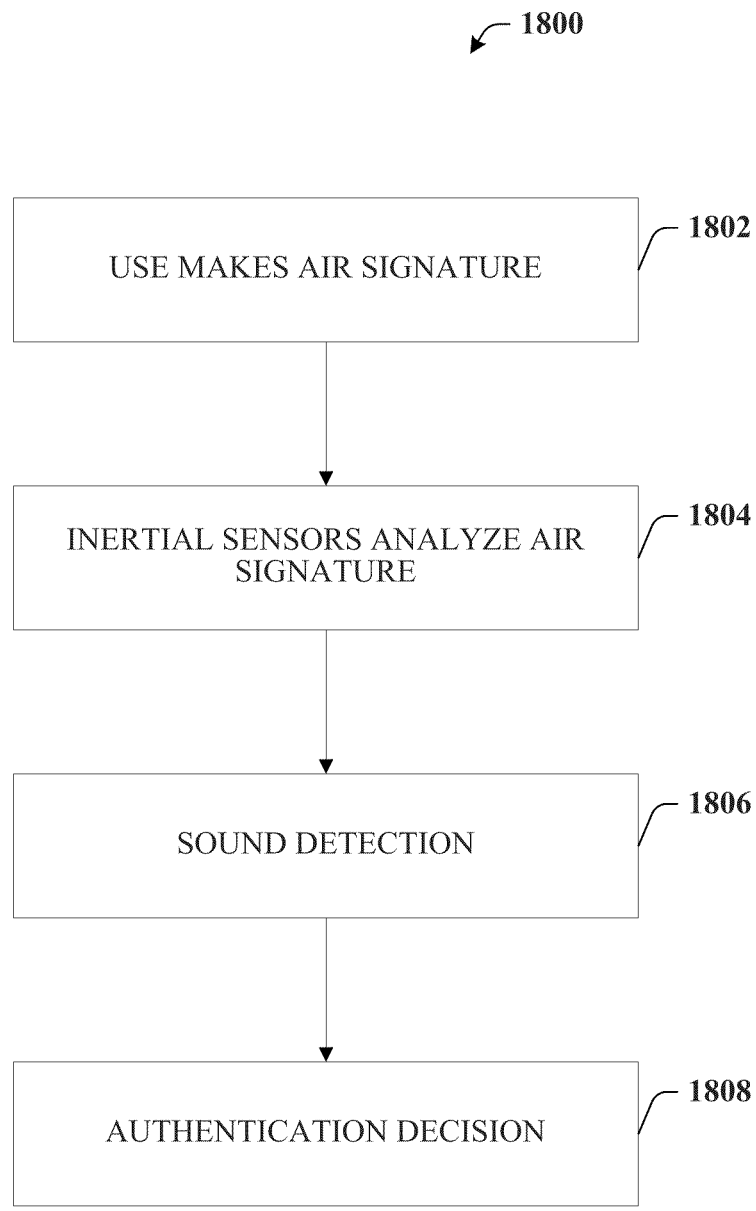
FIG. 18 illustrates an exemplary methodology of the present invention in which a microphone and inertial sensors are used for user authentication.

FIG. 18 illustrates an exemplary methodology of the present invention in which a microphone and inertial sensors are used for user authentication. According to the flow diagram 1800, at Step 1802, a user makes an air signature using the handheld device 1500 including the microphone 1514. At Step 1804, one or more inertial sensors 1502, 1504 and 1506 are used to analyze the user's motion. At Step 1806, a determination is made if a certain sound or spoken word was detected by the microphone 1514 at a pre-determined or pre-programmed time including a time before, during, or after the motion gesture.

The sound can include a sound caused via contact with the device, for example, by either scratching or tapping the handheld device 1500. The scratching motion would be very difficult to see and imitate, making the authentication procedure more secure. The tapping or scratching can be used as a command or as a part of the authentication. The tapping or scratching can be detected by a combination of the information provided by the accelerometer(s) 1504, gyroscope(s) 1502, magnetometer(s) 1506 and the microphone (1514). A motion signal detected by a combination of accelerometers 1504, gyroscopes 1502, and magnetometers 1506, in response to the tapping or scratching, can be combined with an audio signal detected by the microphone 1514. This can help reject unconscious tapping, for example, unconscious tapping performed by switching hands. This can also make it possible to distinguish between tapping with the pad of the finger and tapping with the nail. At Step 1808, if the user's signature matches a signature in a library and the sound detected by the microphone matches a pre-determined or pre-programmed sound, the user is deemed to have been successfully authenticated. Thus, both motion sensors and the microphones are used for user authentication.

Figure 19:
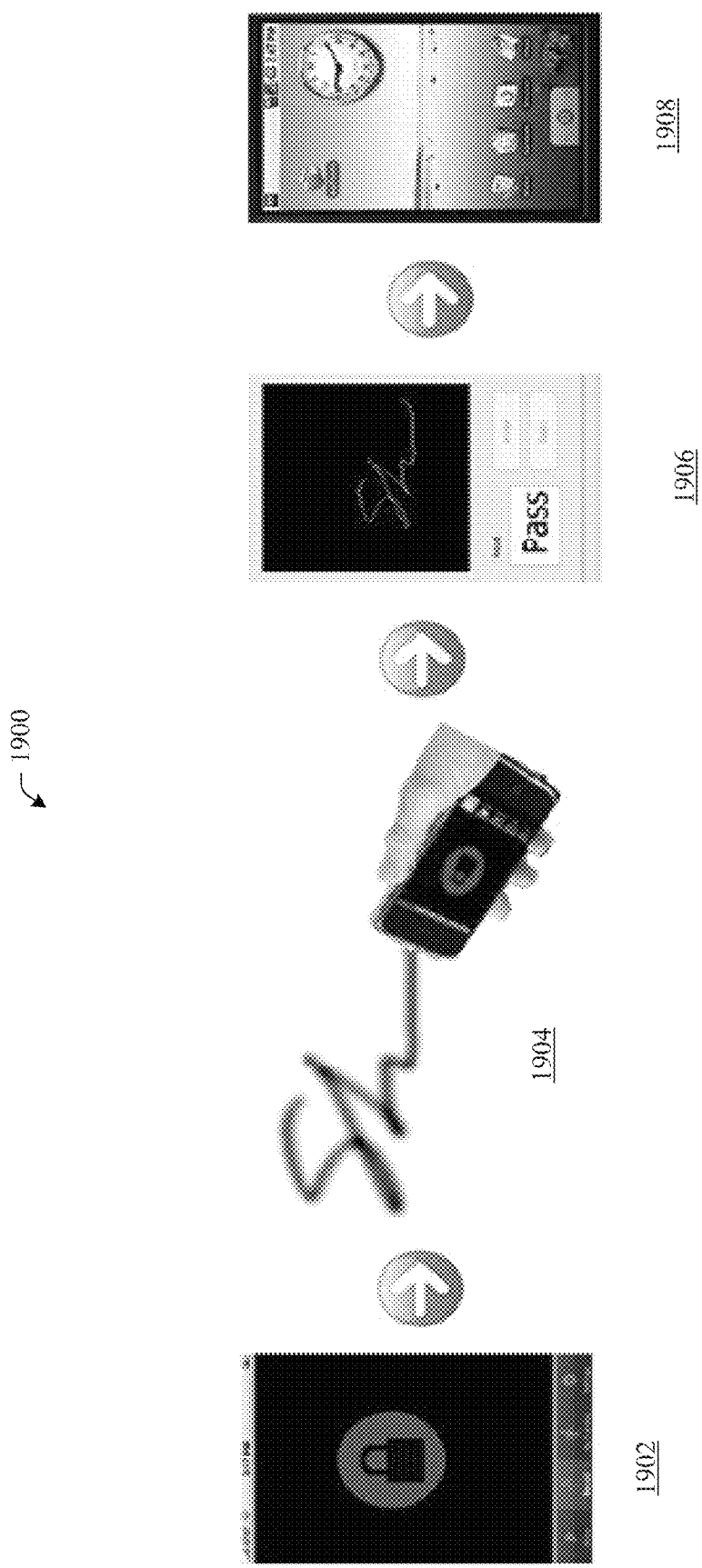
FIG. 19 illustrates an exemplary methodology of the present invention for unlocking a handset screen.

The motion trajectory that can be captured by the motion processing devices and sensors illustrated in FIGS. 10 and 15 is a biometric trait and can be used to authenticate a person's identity. As illustrated by methodology of FIG. 19, an application of motion-based identity authentication for handset 1000, 1500 is screen unlock. The standard design of screen unlock on the conventional smart phones allows a user to input a four digit or letter password or a user-defined line pattern to unlock the screen. A drawback of such a touch-panel based screen lock is that an imposter can guess the password based on the fingerprint smudge of the user. Using motion command to unlock the phone provides the user with a higher level of security.

According to the flow diagram 1900, at Step 1902, the screen (e.g. 1004 in FIG. 10) of the handset 1000, 1500 is locked. At Step 1904, the user performs an air signature by using the handset 1000, 1500. At Step 1906, the handset 1000, 1500 verifies that the user signature is authentic. At Step 1908, the handset 1000, 1500 unlocks the screen. Motion-based identity authentication has wide range of applications. It can easily replace the cumbersome password typing on a smart phone during on-line purchasing. At a kiosk or a supermarket check-out line, the handset can send the captured air signature to the cash register via Bluetooth or other wireless communication means.

Moreover, a smart phone is not the only platform that can realize motion-based identity authentication. The motion processing unit including inertial sensors and processor (e.g. 1012 in FIG. 10) is physically very small and consumes low power such that it can be placed in wearable accessories such as a watch, a keychain, a badge, or a pen. A badge with a motion processing unit transmits ID (identification) as well as signature pattern. It prevents the risk of someone stealing the badge to make unauthorized entry. The biometric characteristics provide an extra layer of security protection at access control points. The biometric authentication method can be applied to access control for homes, offices and cars, for parental control of TV programs, or for entertainment purposes, for example, in a toy that recognizes its owner.

According to an aspect of the present invention, a motion command does not always have to associate with a numerical or alphabetical symbol. The motion command can include any pre-defined motion pattern. For example, a video game console can define a special sword-waving sequence to activate a powerful attack, or determine if the conductor is waving the 3-beat or 4-beat pattern in an orchestra game. The motion command can be used for both entertainment and educational purposes. For example, A golf student can hold the motion processing device and practice swing to check if the hand grip is turned in the right way. Also, by using a television (TV) remote, a user can write a "C" in the air to change the channel to CNN, or an "E" to change it to ESPN.

Exemplary Networked and Distributed Environments

One of ordinary skill in the art can appreciate that the various embodiments of methods and devices for pointing based services and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 2:
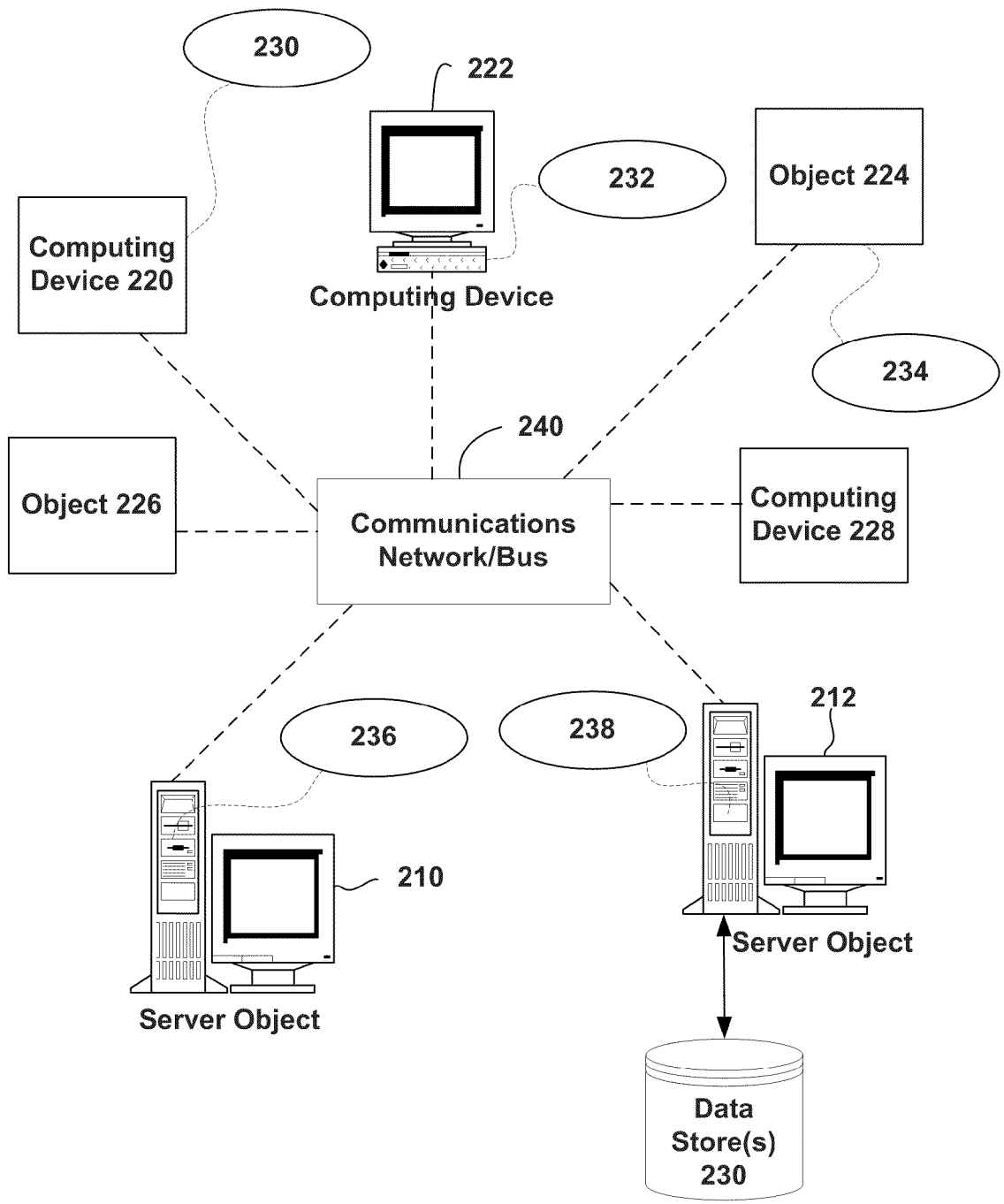
FIG. 2 illustrates an exemplary computer network in which the present invention can be implemented.

FIG. 2 provides a non-limiting schematic diagram of an exemplary networked or distributed computing environment. The distributed computing environment comprises computing objects 210, 212, etc. and computing objects or devices 220, 222, 224, 226, 228, etc., which may include programs, methods, data stores, programmable logic, etc., as represented by applications 230, 232, 234, 236, 238. It can be appreciated that objects 210, 212, etc. and computing objects or devices 220, 222, 224, 226, 228, etc. may comprise different devices, such as remote controllers, PDAs, audio/video devices, mobile phones, MP3 players, laptops, etc.

Each object 210, 212, etc. and computing objects or devices 220, 222, 224, 226, 228, etc. can communicate with one or more other objects 210, 212, etc. and computing objects or devices 220, 222, 224, 226, 228, etc. by way of the communications network 240, either directly or indirectly. Even though illustrated as a single element in FIG. 2, network 240 may comprise other computing objects and computing devices that provide services to the system of FIG. 2, and/or may represent multiple interconnected networks, which are not shown. Each object 210, 212, etc. or 220, 222, 224, 226, 228, etc. can also contain an application, such as applications 230, 232, 234, 236, 238, that might make use of an API, or other object, software, firmware and/or hardware, suitable for communication with or implementation of the delayed interaction model as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 2, as a non-limiting example, computers 220, 222, 224, 226, 228, etc. can be thought of as clients and computers 210, 212, etc. can be thought of as servers where servers 210, 212, etc. provide data services, such as receiving data from client computers 220, 222, 224, 226, 228, etc., storing of data, processing of data, transmitting data to client computers 220, 222, 224, 226, 228, etc., although any computer can be considered a client, a server, or both, depending on the circumstances. Any of these computing devices may be processing data, or requesting services or tasks that may implicate the delayed interaction model and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the direction based services can be provided standalone, or distributed across multiple computing devices or objects.

In a network environment in which the communications network/bus 240 is the Internet, for example, the servers 210, 212, etc. can be Web servers with which the clients 220, 222, 224, 226, 228, etc. communicate via any of a number of known protocols, such as the hypertext transfer protocol (HTTP). Servers 210, 212, etc. may also serve as clients 220, 222, 224, 226, 228, etc., as may be characteristic of a distributed computing environment.

Exemplary Computing Device

As mentioned, various embodiments described herein apply to any device wherein it may be desirable to perform pointing based services, and delay interactions with points of interest. It should be understood, therefore, that handheld, portable and other computing devices and computing objects of all kinds are contemplated for use in connection with the various embodiments described herein, i.e., anywhere that a device may request pointing based services. Accordingly, the general purpose remote computer described below in FIG. 3 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer executable instructions, such as program modules, being executed by one or more computers, such, as client workstations, servers or other devices. Those skilled in the art will appreciate that network interactions may be practiced with a variety of computer system configurations and protocols.

Figure 3:
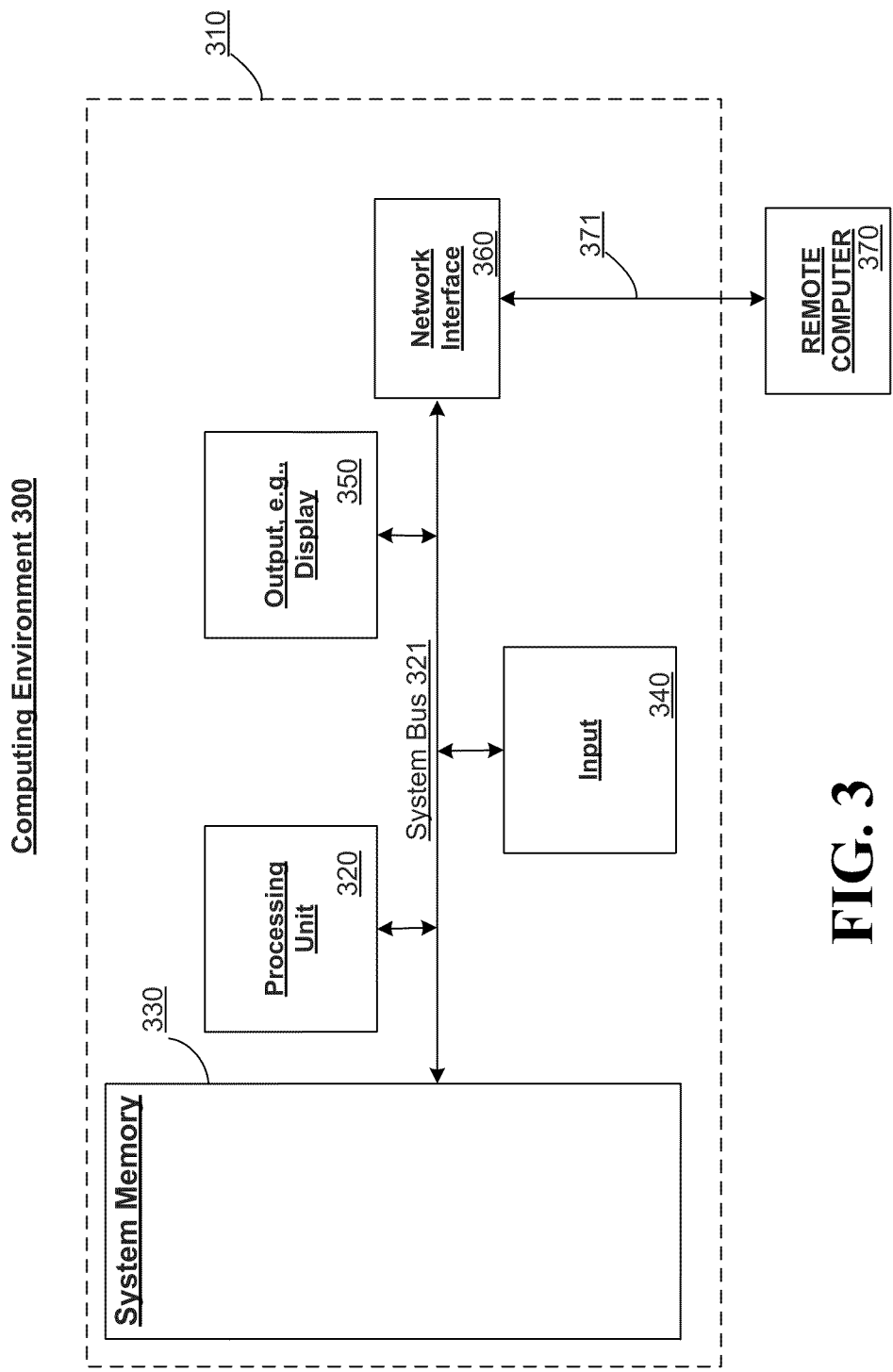
FIG. 3 illustrates an exemplary computing environment in which the present invention can be implemented.

FIG. 3 thus illustrates an example of a suitable computing system environment 300 in which one or more of the embodiments may be implemented, although as made clear above, the computing system environment 300 is only one example of a suitable computing environment and is not intended to suggest any limitation as to the scope of use or functionality of any of the embodiments. Neither should the computing environment 300 be interpreted as having any dependency or requirement relating to any one or combination of components illustrated in the exemplary operating environment 300.

With reference to FIG. 3, an exemplary remote device for implementing one or more embodiments herein can include a general purpose computing device in the form of a handheld computer 310. Components of handheld computer 310 may include, but are not limited to, a processing unit 320, a system memory 330, and a system bus 321 that couples various system components including the system memory to the processing unit 320.

Computer 310 typically includes a variety of computer readable media and can be any available media that can be accessed by computer 310. The system memory 330 may include computer storage media in the form of volatile and/or nonvolatile memory such as read only memory (ROM) and/or random access memory (RAM). By way of example, and not limitation, memory 330 may also include an operating system, application programs, other program modules, and program data.

A user may enter commands and information into the computer 310 through input devices 340. A monitor or other type of display device is also connected to the system bus 321 via an interface, such as output interface 350. In addition to a monitor, computers may also include other peripheral output devices such as speakers and a printer, which may be connected through output interface 350.

The computer 310 may operate in a networked or distributed environment using logical connections to one or more other remote computers, such as remote computer 370. The remote computer 370 may be a personal computer, a server, a router, a network PC, a peer device or other common network node, or any other remote media consumption or transmission device, and may include any or all of the elements described above relative to the computer 310. The logical connections depicted in FIG. 3 include a network 371, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to derive information about surrounding points of interest.

There are multiple ways of implementing one or more of the embodiments described herein, e.g., an appropriate API, tool kit, driver code, operating system, control, standalone or downloadable software object, etc. which enables applications and services to use the pointing based services. Embodiments may be contemplated from the standpoint of an API (or other software object), as well as from a software or hardware object that provides pointing platform services in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A handheld device, comprising:
    inertial sensors comprising a gyroscope that generates gyroscope data representing a trajectory of a movement of the handheld device and an accelerometer that generates accelerometer data representing a tilt of the handheld device relative to earth's gravity; and
    a processing component that:
        determines the trajectory of the movement of the handheld device by combining the gyroscope data representing the trajectory of the movement of the handheld device and the accelerometer data representing the tilt of the handheld device relative to earth's gravity;
        converts, via a training mode, a first portion of the data into a first set of values corresponding to a first plurality of discrete features,
        associates the first set of values with a character, stores the first set of values and information representing the character in a training database,
        converts, via a recognition mode, a second portion of the data into a second set of values corresponding to a second plurality of discrete features, wherein a discrete feature of the first plurality of discrete features or the second plurality of discrete features includes at least one of an angle of the trajectory, an inverse tangent of a change in a pitch associated with the movement divided by a change in a yaw associated with the movement, a location of a crossing point associated with the character, or a number of times in which the trajectory changes direction; and
        in response to a determination that the second set of values matches the first set of values with respect to a defined condition, displays the character.

2. The handheld device of claim 1, wherein the inertial sensors further comprise a compass.

3. The handheld device of claim 1, wherein the processing component stores at least a portion of the second set of values in a data store.

4. The handheld device of claim 1, further comprising:
    a display for displaying the trajectory of the movement.

5. The handheld device of claim 1, wherein the character is associated with at least one of a letter from an alphabet, a roman numeral, a signature associated with an identity of a user, or an authentication signal.

6. The handheld device of claim 1, wherein the processing component executes a command associated with an application program associated with the handheld device or an operating system associated with the handheld device.

7. The handheld device of claim 6, wherein the command triggers an event in a video game.

8. The handheld device of claim 6, wherein the command opens or closes the application program or controls a set of applications running within the operating system.

9. The handheld device of claim 1, wherein the processing component matches, via the recognition mode, the first set of values with the second set of values using at least one of a look-up table, a Hidden Markov Model (HMM), a neural network, or a support vector machine.

10. The handheld device of claim 1, wherein the processing component matches, via the recognition mode, the first set of values with the second set of values according to one or more segments.

11. The handheld device of claim 10, wherein the one or more segments represent a letter and the first set of values or the second set of values represents a word.

12. The handheld device of claim 1, wherein the processing component compares, via the determination, the first set of values with the second set of values.

13. The handheld device of claim 1, wherein the processing component executes a command in response to the determination that the second set of values matches the first set of values.

14. A method for gesture recognition, comprising:
    obtaining first training data related to a first trajectory of a first movement of a handheld device using a gyroscope and an accelerometer;
    determining the first trajectory in response to integrating a portion of the first training data associated with the gyroscope with another portion of the first training data associated with the accelerometer representing a first tilt of the handheld device relative to earth's gravity;
    converting the first training data into first values corresponding to a first set of a plurality of discrete features; wherein a discrete feature of the plurality of discrete features includes at least one of an angle of the trajectory, an inverse tangent of a change in a pitch associated with the movement divided by a change in a yaw associated with the movement, a location of a crossing point associated with the character, or a number of times in which the trajectory changes direction;
associating the first values with a first character;
storing the first values and information representing the first character in a data store; and
displaying the first character based on the first values.

15. The method of claim 14, wherein the obtaining the first training data comprises:
obtaining the first training data using the gyroscope, the accelerometer, and a sensor comprising a compass.

16. The method of claim 14, wherein the plurality of discrete features represents a number of direction changes.

17. The method of claim 14, wherein the plurality of discrete features relate to an angular movement of the handheld device.

18. The method of claim 14, further comprising:
learning a character with a plurality of strokes according to a plurality of vectors.

19. The method of claim 14, further comprising:
executing a first command associated with the first values.

20. The method of claim 14, further comprising:
obtaining second training data related to a second trajectory of a second movement of the handheld device using the gyroscope and the accelerometer;
determining the second trajectory in response to integrating a portion of the second training data associated with the gyroscope with another portion of the second training data associated with the accelerometer representing a second tilt of the handheld device relative to earth's gravity;
converting the second training data into second values corresponding to a second set of the plurality of discrete features;
associating the second values with a second character;
storing the second values and information representing the second character in the data store;
obtaining trajectory data related to a third trajectory of a third movement of the handheld device using the gyroscope and the accelerometer;
converting the trajectory data into third values corresponding to a third set of the plurality of discrete features;
matching the third values with the first values or the second values; and
displaying the first character or the second character in response to the matching.

21. A handheld device, comprising:
a gyroscope;
an accelerometer;
a processing component that receives gyroscope data from the gyroscope representing a trajectory of a movement of the handheld device and receives accelerometer data from the accelerometer representing a tilt of the handheld device relative to earth's gravity;
a programmable module coupled to the processing component that includes a look up table that associates a plurality of discrete features comprising the trajectory of the movement of the handheld device and the tilt of the handheld device with a plurality of characters; and
a data store for storing a plurality of sets of values corresponding to the plurality of discrete features, wherein the processing component converts a first portion of the data into a first set of values corresponding to first features of the plurality of discrete features, associates, utilizing the look up table, the first set of values with a character of the plurality of characters based on the first features, stores the first set of values and information representing the character in the data store, converts a second portion of the data into a second set of values corresponding to second features of the plurality of discrete features, matches, using the data store, the second set of values to one of the plurality of sets of values, and displays the character using the information, wherein a discrete feature of the plurality of discrete features includes at least one of an angle of the trajectory, an inverse tangent of a change in a pitch associated with the movement divided by a change in a yaw associated with the movement, a location of a crossing point associated with the character, or a number of times in which the trajectory changes direction.

22. The handheld device of claim 21, further comprising:
a display for displaying the trajectory in real time and displaying the character based on a third set of values corresponding to the trajectory.

23. The handheld device of claim 21, wherein the processing component executes commands, and wherein the look up table associates the plurality of discrete features with the commands.

24. The handheld device of claim 21, wherein the look up table associates the plurality of discrete features with the plurality of characters utilizing sets of values corresponding to rows of the look up table.

25. A method, comprising:
obtaining first information from a gyroscope based on a first trajectory of a first movement of a handheld device;
storing the first information and authentication information representing an identity of a user in a training data store;
obtaining second information from the gyroscope based on a second trajectory of a second movement of the handheld device;
in response to determining an orientation of the handheld device utilizing a magnetometer, modifying the first information and the second information according to the orientation; wherein the first trajectory and the second trajectory are connected to a set of values corresponding to a set of selected discrete features wherein a discrete feature of the plurality of discrete features includes at least one of an angle of the trajectory, an inverse tangent of a change in a pitch associated with the movement divided by a change in a yaw associated with the movement, a location of a crossing point associated with the character, or a number of times in which the trajectory changes direction;
in response to the modifying, comparing the second information with the first information; and
authenticating the identity of the user in response to the comparing of the second information with the first information.

26. The method of claim 25, wherein the first movement or the second movement represents a signature of the user.

27. The method of claim 25, further comprising:
generating a sound within a predetermined time period before or after the second movement;
detecting the sound using a microphone embedded in the handheld device; and
authenticating the user in response to the comparing and the detecting.

28. A handheld device, comprising:
a first processor;
a programmable module comprising a look up table that associates a plurality of discrete features representing trajectories of movements of the handheld device with a plurality of commands; wherein a discrete feature of the plurality of discrete features includes at least one of an angle of the trajectory, an inverse tangent of a change in a pitch associated with the movement divided by a change in a yaw associated with the movement, a location of a crossing point associated with the character, or a number of times in which the trajectory changes direction; and a gyroscope, wherein the first processor receives at least a portion of first information related to a first movement of the handheld device from the gyroscope, determines the first movement based on the portion, consults the look up table and matches the first movement to a command from the plurality of commands, and wherein a first component coupled to the first processor enters a first active mode of operation from a sleep mode of operation based on the command.

29. The handheld device of claim 28, further comprising: a second processor coupled to the gyroscope for processing the first information.

30. The handheld device of claim 29, wherein the second processor receives the first information from the gyroscope, and wherein
the first processor enters a second active mode of operation in response to receiving another portion of the first information from the second processor.

31. The handheld device of claim 28, further comprising: an accelerometer for providing second information related to the first movement of the handheld device, wherein the first component enters the first active mode of operation based on the second information.

32. The handheld device of claim 28, further comprising a smartphone.

33. The handheld device of claim 28, further comprising: a camera; and
a display, wherein the camera switches from the sleep mode to the first active mode based on the first movement, wherein the camera uses more electrical power during the first active mode than during the sleep mode, and wherein the display is not switched from the sleep mode to the first active mode based on the first movement.

34. The handheld device of claim 28, further comprising a second processor coupled to the gyroscope for causing the first processor to enter into the first active mode of operation based on the first movement.

35. The handheld device of claim 28, further comprising: a second processor that facilitates switching the microprocessor from the sleep mode to the first active mode based on the first movement,
wherein the first processor comprises a microprocessor,
wherein the first component comprises a camera,
wherein the microprocessor facilitates switching the camera from the sleep mode to the first active mode based on the first movement,
wherein the microprocessor facilitates switching the display from the sleep mode to the first active mode based on a second movement of the handheld device and not based on the first movement, and
wherein the first active mode of operation is associated with a first consumption of electrical power that is greater than a second consumption of electrical power associated with the sleep mode of operation.

36. The handheld device of claim 28, wherein the look up table associates the plurality of movements with the plurality of commands using rows corresponding to sets of values.

37. A method, comprising:
receiving, by a system comprising a processor, information from a gyroscope regarding a movement of the system;
consulting a look up table that associates discrete features representing trajectories of movements of the system with a plurality of commands;
wherein a discrete feature of the first plurality of discrete features or the second plurality of discrete features includes at least one of an angle of the trajectory, an inverse tangent of a change in a pitch associated with the movement divided by a change in a yaw associated with the movement, a location of a crossing point associated with the character, or a number of times in which the trajectory changes direction;
matching the movement to a command from the plurality of commands; and
switching, based on the command, a component of the system from a sleep mode of operation to an active mode of operation.

38. The method of claim 37, wherein the information further comprises information received from an accelerometer.

39. The method of claim 37, wherein the component comprises a camera.

40. The method of claim 37, wherein the component comprises a display.

41. The method of claim 37, wherein the component comprises a microphone.

42. The method of claim 37, wherein the movement corresponds to a touch of the system.

43. The method of claim 37, further comprising:
preventing another component of the system from switching from the sleep mode to the active mode based on the movement.

44. The method of claim 37, wherein the plurality of movements are associated with the plurality of commands based on sets of values corresponding to rows of the look up table.

45. A method, comprising:
detecting a first position of a mobile phone using a gyroscope;
consulting a look up table and matching the first position with a first command corresponding to a first column of the look up table representing a first trajectory of the mobile phone;
causing, based on the first command, a component of the mobile phone to enter into a sleep mode of operation;
detecting a second position of the mobile phone by using the gyroscope;
consulting the look up table and matching the second position with a second command corresponding to a second column of the look up table representing a second trajectory of the mobile phone;
causing, based on the second command, the component of the mobile phone to enter into an active mode of operation.

46. The method of claim 45, wherein the detecting the first position further comprises detecting the first position using an accelerometer.

* * * * *